United States Patent [19]
Fukushima et al.

[11] Patent Number: 5,997,402
[45] Date of Patent: Dec. 7, 1999

[54] POWER TRANSFER APPARATUS HAVING A VIBRATION DAMPENING MECHANISM WHICH PROVIDES STRUCTURAL SUPPORT FOR THE APPARATUS

[75] Inventors: Hirotaka Fukushima, Hirakata; Koji Kajitani, Tsuzuki-gun; Hiroyoshi Tsuruta, Kadoma; Masanobu Fukamachi, Hirakata, all of Japan

[73] Assignee: Exedy Corporation, Neyagawa, Japan

[21] Appl. No.: 08/912,668

[22] Filed: Aug. 18, 1997

Related U.S. Application Data

[62] Division of application No. 08/768,564, Dec. 18, 1996, Pat. No. 5,695,035, which is a division of application No. 08/382,307, Jan. 31, 1995, Pat. No. 5,617,940.

[30] Foreign Application Priority Data

| Feb. 8, 1994 | [JP] | Japan | 6-14530 |
| Feb. 8, 1994 | [JP] | Japan | 6-14531 |
| Feb. 14, 1994 | [JP] | Japan | 6-17675 |
| Feb. 14, 1994 | [JP] | Japan | 6-17676 |
| Feb. 14, 1994 | [JP] | Japan | 6-17677 |
| Feb. 14, 1994 | [JP] | Japan | 6-17678 |
| Feb. 14, 1994 | [JP] | Japan | 6-17679 |
| Feb. 14, 1994 | [JP] | Japan | 6-17680 |
| Feb. 14, 1994 | [JP] | Japan | 6-17681 |
| Feb. 14, 1994 | [JP] | Japan | 6-17682 |
| Feb. 14, 1994 | [JP] | Japan | 6-17683 |
| Feb. 14, 1994 | [JP] | Japan | 6-17684 |

[51] Int. Cl.⁶ .................................................. F16D 3/80
[52] U.S. Cl. .................. 464/24; 192/55.4; 192/208; 464/68
[58] Field of Search ................ 464/24, 68, 98; 192/55.4, 208; 74/574

[56] References Cited

U.S. PATENT DOCUMENTS

| 5,249,659 | 10/1993 | Fukushima | 464/24 |
| 5,353,664 | 10/1994 | Yamamoto | 192/55.4 |
| 5,609,231 | 3/1997 | Matsuoka | 464/24 |
| 5,617,940 | 4/1997 | Fukushima et al. | 192/208 |
| 5,695,305 | 12/1997 | Fukushima et al. | 192/208 |
| 5,730,656 | 3/1998 | Yamamoto | 464/68 |

*Primary Examiner*—Eileen Dunn Lillis
*Attorney, Agent, or Firm*—Shinjyu An Intellectual Property Firm

[57] ABSTRACT

A power coupling mechanism having fluid dampening device with interfitting members which assist in the absorption and transmittance of stress due to torsion and thrust loads, thus reducing the size of a bearing supporting relatively rotatable parts.

16 Claims, 20 Drawing Sheets

POWER TRANSFER APPARATUS HAVING A VIBRATION DAMPENING MECHANISM WHICH PROVIDES STRUCTURAL SUPPORT FOR THE APPARATUS

This application is a division of application Ser. No. 08/768,564, filed Dec. 18, 1996, now U.S. Pat. No. 5,695,035, which is a division of application Ser. No. 08/382,307 filed Jan. 31, 1995, now U.S. Pat. No. 5,617,940.

BACKGROUND OF THE INVENTION

1. Field of the Invention

The present invention relates to a power transfer apparatus having a vibration dampening mechanism, and more particularly, a power transfer apparatus disposed between a crankshaft of a power producing device, such as an internal combustion engine, and a power output device, such as an automotive transmission, for transmitting torque therebetween, where portions of the vibration dampening mechanism provide structural support for the power transfer apparatus in the presence of axial stresses, such as thrust force in an axial direction on the power transfer apparatus.

2. Description of Related Art

Power transfer apparatus having a pair of flywheels and a clutch mechanism, usually placed between a crankshaft of an engine and a transmission are well known.

For example, there are flywheel assemblies in which two flywheels are combined to absorb vibration from an engine. One such flywheel assembly includes a first flywheel connected to the crankshaft in the engine, a second flywheel supported by the first flywheel for limited relative rotation therebetween, and a dampening element elastically connecting the first flywheel to the second flywheel in a circumferential direction for dampening torsional vibration between the first and second flywheels. The second flywheel has a friction surface formed on its one side close to a transmission, and a clutch is fixed to the friction surface.

The clutch is comprised mainly of a clutch disk assembly and a clutch cover assembly. The clutch disk assembly has an annular clutch disk which selectively contacts the friction surface of the second flywheel, and a hub flange having splines mated with a main drive shaft in the transmission. The clutch cover assembly includes a saucer-like clutch cover having its exterior circumferential edge fixed to the flywheel, an annular pressure plate enclosed in the clutch cover for pressing the clutch disk against the friction surface of the second flywheel, and a diaphragm spring held by the clutch cover for urging the pressure plate toward the second flywheel.

Disadvantages of the prior art power transfer device will be listed below.

1) The flywheel assembly and the clutch separately made, make for a large number of parts, and costly manufacturing.
2) In disengaging the clutch, the forces associated with the release load are transmitted to the second flywheel via the clutch cover. The force applied to the second flywheel is then transmitted to a bearing disposed between the first and second flywheels. The bearing must be able to withstand the forces associated with disengagement of the clutch. Therefore, the bearing must be able to withstand large forces and still be rotatable. However, such a bearing is expensive and occupies a large space in radial direction. This impose a great restriction upon the design of the interior of the dampening element in the flywheel mechanism.
3) If the first flywheel of the power transfer device is mounted to a disk-shaped flexible plate which is mounted to the crankshaft, and the flexible plate and the first flywheel are fixed at their respective outer circumferences to each other, and a bearing is provided surrounding a boss of the first flywheel to hold the second flywheel rotatably relative to the first flywheel, then it is difficult to ensure accurate concentric positioning of the flexible plate with the first flywheel and the concentric positioning of other parts.

In another prior art flywheel assembly, a fluid duct filled with fluid is defined by a disk-shaped element within a chamber partially defined by the first flywheel. A dampening element for dampening torsional vibration is provided within the chamber. The first flywheel has a center boss extending toward the transmission, and the second flywheel is supported thereon via a bearing which encircles the center boss of the first flywheel allowing for limited relative rotation between the two flywheels.

The flywheel assembly may be provided with a flexible plate which can flex itself in an axial direction between the crankshaft in the engine and the first flywheel in order to absorb flexural vibration from the engine. The flexible plate has its inner circumferential edge fixed to tip of the crankshaft and its outer circumferential edge fixed to the outer circumference of the first flywheel. A plurality of bolts are disposed circularly at the same intervals. A ring gear to start the engine is fixed at the outer circumference of the first flywheel.

Some of the disadvantages of the flywheel assembly will be listed below:

1) A seal member must be provided between the disk element and a power output element to seal the fluid within the chamber. It is desirable that a pre-load is applied to the bearing supporting the first and second flywheels, and for that purpose, an elastic element must be provided. As will be recognized, provision of the seal element and the elastic element increases the number of parts, which in turn causes a cost to rise.
2) The dynamics of the flywheel assembly are such that flexural vibration from the engine may produce noise. The damper mechanism requires a certain level of inertia in order to absorb vibrations. If there is insufficient inertia, the flywheel assembly cannot absorb torsional vibration from the engine.
3) Since the flexible plate and the first flywheel are fixed at their respective circumferences to each other, relative location among the flexible plate and the boss and bearing for the first flywheel are determined at the outer circumferences of the flexible plate and the first flywheel, and this causes the parts to be less concentric. The bearing is positioned outside a pitch circle of the bolts, and this imposes a restriction upon the design of the interior of the damper.
4) A power transfer device system including a damper in an automobile must increase moment of inertia of a power output mechanism to reduce a resonance frequency to an engine's idling speed or below. However, the ring gear to start the engine is fixed to the outer circumference of the first flywheel, and hence, a ratio of the moment of inertia of the power output mechanism cannot be sufficiently increased.

In another prior art mechanism, a damper mechanism includes a hub flange, a bearing and a dampening element. A power input element is coupled to a crankshaft in the engine while the hub flange is coupled to a main drive shaft extending from the transmission. The hub flange has a boss extending toward the transmission and a flange formed at the outer circumference of the boss. The bearing is provided between a power receiving element and the hub flange to support both of them rotatably relative to each other. The dampening element is provided within a fluid space to elastically connect the power receiving element and the hub flange in a circular direction and further to dampen torsional vibration between them. A driven plate connecting the dampening element and the hub flange is provided therebetween. The dampening element includes an elastic element provided in a window spreading toward the circumference of the driven plate, and a resistance generating mechanism for producing resistance when the input receiving element and the driven plate are relatively rotated. The window in the driven plate supports the elastic element which expands or contracts due to the torsional vibration. When the window is small in thickness, a greater bearing pressure is applied to the window, and an edge of the window has its lifetime shortened. Thus, a plurality of disk-like sheet metal plates or thick casting parts may be used to thicken and reinforce the driven plate.

Disadvantages of the prior art damper are listed below:
1) Since the hub flange and the driven plate are separately made, there are a large number of parts making the overall configuration complicated and costly to manufacture. Moreover, the flange of the boss extends outward to support the bearing. The boss itself, as a whole, is bulky. Since the boss is made of casting material, it has considerable mass and weight and is costly to manufacture.
2) The boss in the power output element protrudes toward the transmission. Thus, the damper is large in an axial direction.
3) A seal element must be provided between the hub flange and other parts to seal the fluid space. The number of components increases because of the seal element making the device costly to manufacture.
4) The hub flange is supported by the bearing on an outer circumference of the boss in the power input element so as to rotate relative to the power input element. The bearing is affected by thrust load and radial load. Thus, the bearing employed herein must be sufficiently large in the radial direction. With such a large bearing, manufacturing is costly, and the bearing occupies a large space in the radial directions. Consequently, a restriction is imposed upon a design of the inside of the dampening element.
5) The driven plate has an undesirably large mass and weight increasing cost and adding weight to the machine it is mounted in. In the case an automobile, where weight reduces fuel efficiency, this is undesirable.

SUMMARY OF THE INVENTION

One object of the present invention is to reduce the number of parts in a power transmitting devices.

Another object of the present invention is to miniaturize a bearing between, for instance, a first and second flywheel in a two flywheel construction.

Another object of the present invention is to omit a bearing entirely.

It is further another object of the present invention to facilitate attachment of the bearing.

It is still another object of the present invention to reduce a fabrication cost.

It is another object of the present invention to design the inside of a dampening element with fewer design restrictions.

It is further another object of the present invention to position parts as concentric as possible with respect to one another.

It is still another object of the present invention to simplify a configuration of a power transmitting device.

It is yet another object of the present invention to absorb bending vibration from a power input element and increase the total moment of inertia.

It is still another object of the present invention to increase moment of inertia of a power output element in a damper.

It is another object of the present invention to reduce a weight of a boss.

It is further another object of the present invention to decrease dimensions of a damper in an axial direction.

It is still another object of the present invention to facilitate fabrication of a power transmission device.

It is yet another object of the present invention to reduce a weight of a driven plate.

In accordance with one aspect of the present invention, a damper disk assembly is adapted to transmit torque between an input member and an output member. The damper disk assembly includes a first plate member coupled to the power input member and a hub coupled to the output member. A second plate member has an inner circumferential portion thereof fixed to an outer circumference of the hub and a bearing is supported between the first plate member and the second plate. The bearing is adapted to allow relative rotation between the first and second plate members. A dampening portion elastically couples the first plate member and the second plate member in a circular direction for dampening torsional vibration between the first plate member and the hub.

Preferably, the bearing has an outer race and an inner race, the outer race is attached to the second plate member and the inner race is attached to the first plate member.

Preferably, the first plate member includes a disk-like plate formed from sheet metal material and a supporting element fixed to the disk-like plate for supporting the inner race.

Preferably, the supporting element is an annular member having an L-shaped when viewed in cross section.

Preferably, the second plate member is formed of a sheet metal material shaped with an annular projection engaged with the outer race.

Preferably, the dampening portion includes a single sheet metal disk-like device plate connected to the first plate member. The disk-like drive plate is formed with an arcuate shaped first wall extending in a circular direction. The disk-like drive plate is formed with a radially extending second wall, the first and second walls at least partially defining a chamber. An elastic element is disposed in the chamber, the elastic member being supported by the second wall. A sheet metal disk-like driven plate is connected to the second plate member, the driven plate extending into the chamber contacting the elastic element such that the elastic element elastically couples the first plate member and the driven plate in the circular direction. A hysteresis resistance generating device for produces hysteresis resistance to relative rotary displacement between the first plate member and the hub.

Preferably, the first plate member, the drive plate and the driven plate define the chamber, the chamber being fluid filed.

Preferably, the damper disk assembly includes at least one annular housing having two co-axial spaced apart circumferentially extending walls and an annular wall extending in a radial direction therebetween, the annular housing being open in an axial direction toward the first plate member. A slider member is disposed in the annular housing, the slider member having an arcuate shape having two co-axial circumferentially extending walls and a wall extending in a radial direction therebetween and two circumferential end walls extending between the co-axial circumferentially extending walls of the slider member. The slider member is also open in an axial direction toward the first plate. The driven plate is formed with a radially outward extending projection that extends into the slider. The projection extend radially outward adjacent to the first plate member such that in response to relative rotary displacement between the hub and the first plate member, the projection moves in a circumferential direction within the slider member within a first range of relative rotary displacement, and within a second range of relative rotary displacement the projection engages one of the end walls of the slider member such that the slider member moves in a circumferential direction within the annular housing thereby generating fluid resistance to movement.

These and other objects, features, aspects and advantages of the present invention will become more fully apparent from the following detailed description of the present invention when taken in conjunction with the accompanying drawings where like reference numerals denote corresponding parts throughout, in which:

DESCRIPTION OF THE PREFERRED EMBODIMENT

FIRST EMBODIMENT

Figure 1:
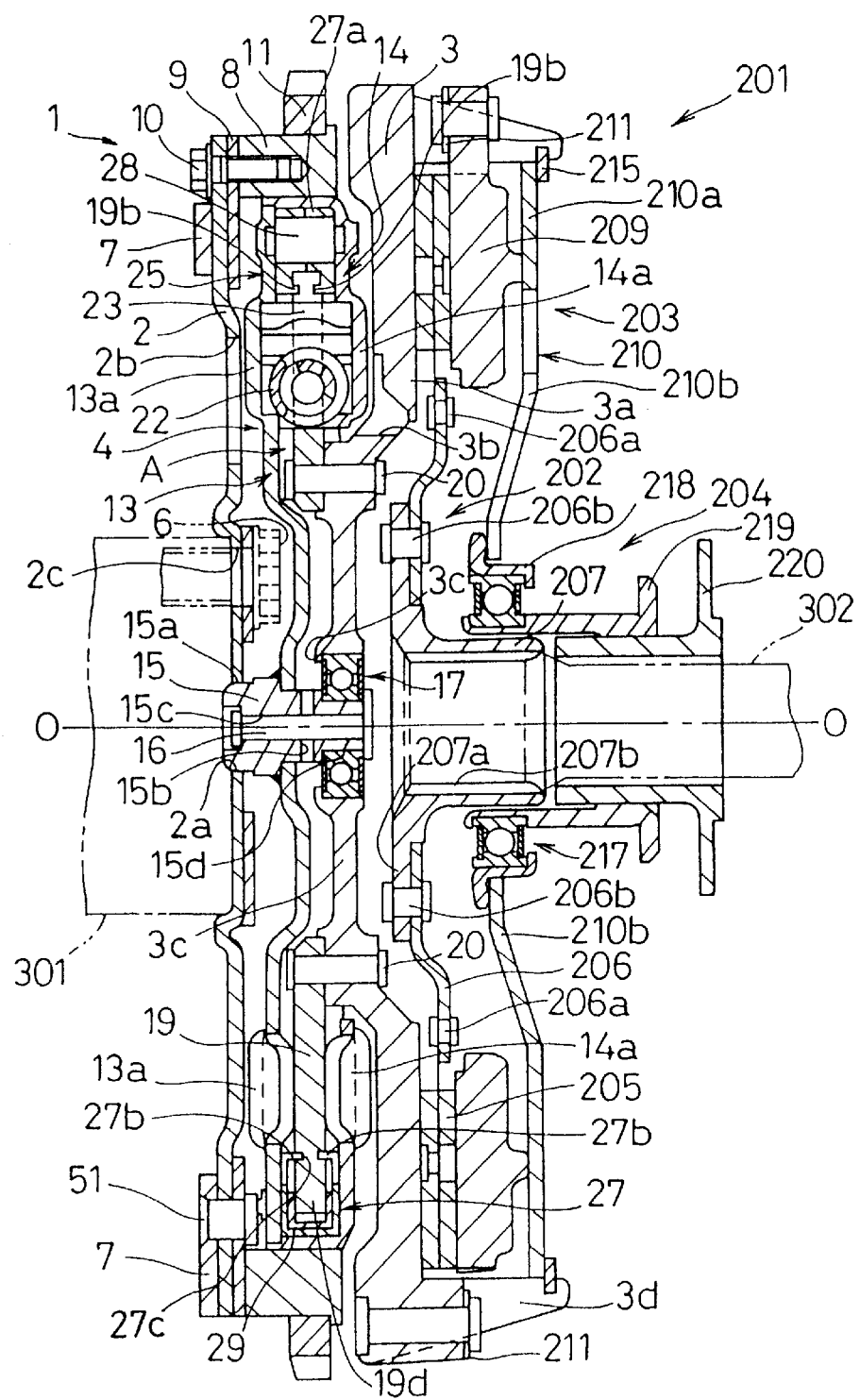
FIG. 1 is a fragmentary, side section showing a power transfer apparatus in accordance with a first embodiment of the present invention.

FIGS. 1 to 10 illustrates a power transfer device 201 in accordance with a first embodiment of the present invention. The power transfer device 201 works to transmit torque from a crankshaft 301 in an engine to a main drive shaft 302 in a transmission. In FIG. 1, the engine (not shown) is positioned on the left in the figure while the transmission (not shown) is positioned on the right in the figure. Line O—O in FIG. 1 is a rotation axis of the power transfer device 201, and R1 denotes a direction of rotations by the power transfer device 201.

The power transfer device 201 is includes a flywheel assembly 1, a clutch disk assembly 202 and a clutch coupler 203 all integrally fixed to one another.

The flywheel assembly 1 primarily includes a flexible plate 2, a ring element 8 fixed to the flexible plate 2, a disk-like flywheel 3, and a dampening element 4 elastically coupling the ring element 8 and the flywheel 3 in a circular direction to dampen torsional vibration between them.

Figure 2:
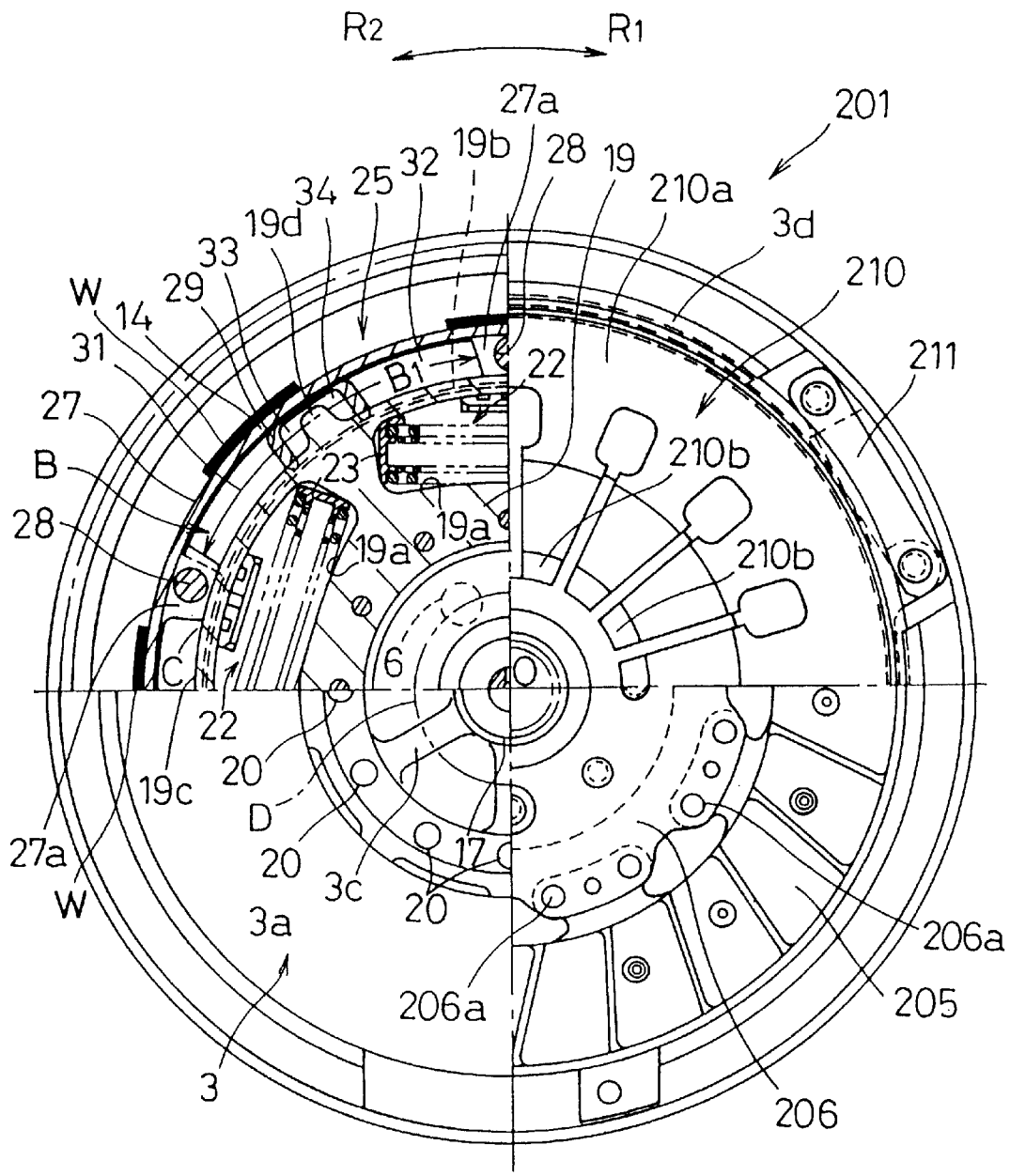
FIG. 2 is a part section, part elevation rear view (as viewed from the transmission) of the power transfer apparatus depicted in FIG. 1.
Figure 3:
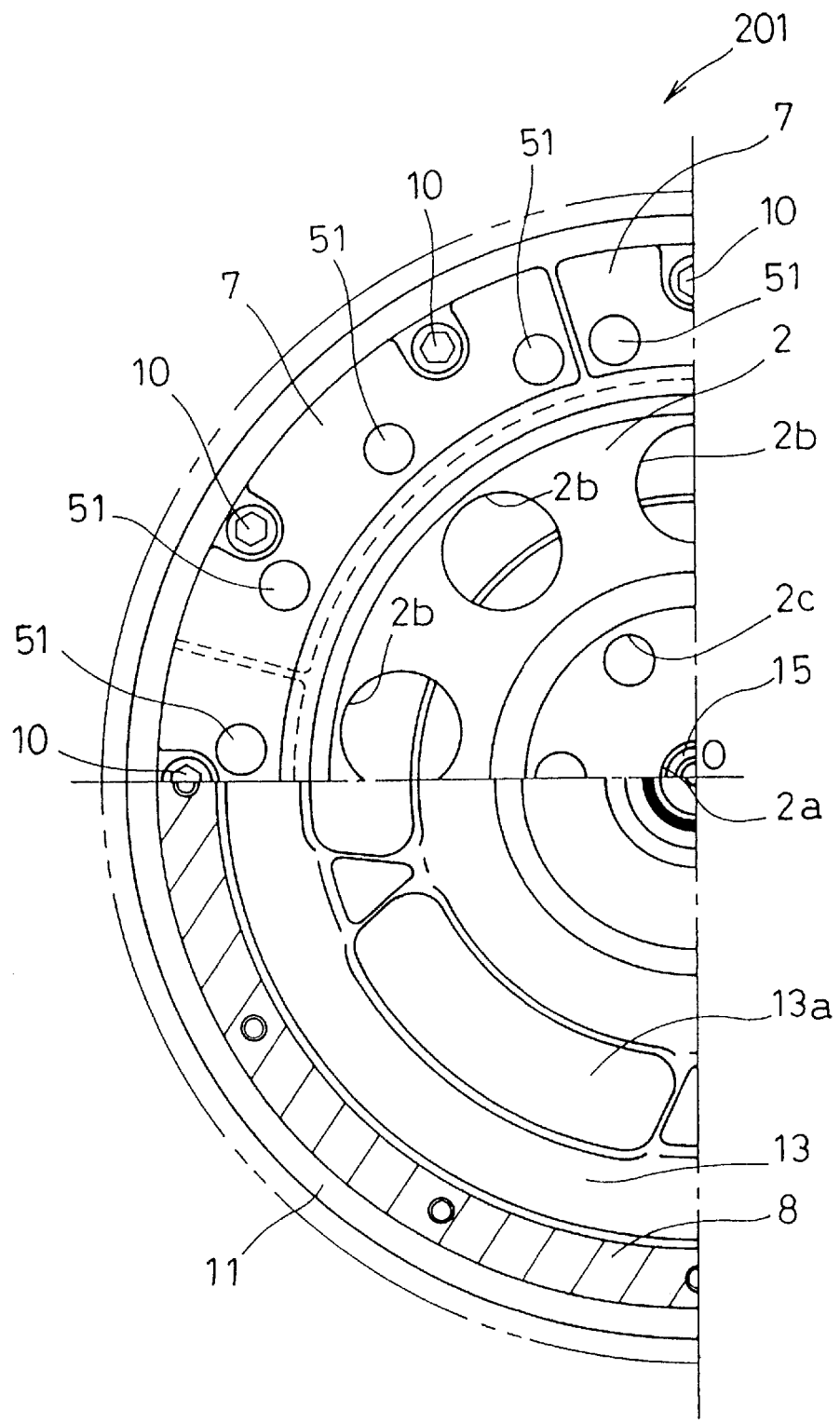
FIG. 3 is a fragmentary, part section, part elevation, front view, showing further details of the power transfer apparatus depicted in FIG. 1, as seen from the engine.

The flexible plate 2 is a roughly disk-shaped component which can flex slightly in axial directions and which has a greater rigidity in a rotational direction. As is shown in FIGS. 1 and 2, the flexible plate 2 has a center hole 2a at its center. The flexible plate 2 has a plurality of round holes 2b (see FIG. 3) formed at spaced apart intervals in a circular direction at a radially intermediate portion of the plate 2. Inward from the round holes 2b a plurality of bolt holes 2c are circularly formed on the plate 2. Bolts 6 fitted through the bolt holes 2c fix an inner circumferential edge of the flexible plate 2 to an end of the crankshaft 301. As is shown in FIG. 3, a plurality of arched inertia elements 7 are fixed to the flexible plate 2 by rivets 51. The inertia elements 7 causes moment of inertia of the flywheel assembly 1 to increase. Since the inertia elements 7 are arcuate in shape and are segmented, the inertia elements 7 do not restrain or prevent the flexible plate 2 from flexing itself in axial directions. An outer circumferential edge of the flexible plate 2 is fixed to the ring element 8 by bolts 10, with the disk plate 9 interposed between them. The inertia elements 7 have notches corresponding to the bolts 10, respectively.

A ring gear 11, used to start the engine, is fixed to the outer circumference of the ring element 8.

The dampening element 4 has a first power input plate 13, a second power input plate 14, a boss 15, a driven plate 19, a coil spring 22 and a viscous resistance generator 25. The first power input plate 13 and the second power input plate 14 are disk-like plate elements. An outer circumferential wall fixed to an outer circumferential edge of the first power input plate 13 is formed at an outer circumference of the second power input plate 14, extending toward the engine. The outer circumferential wall is welded to an inner circumference of the ring element 8. The inner circumferential edge of the second power input plate 14 is larger in diameter than that of the first power input plate 13. The first power input plate 13 and the second power input plate 14 together define a fluid space A for accommodating the driven plate 19, the coil spring 22, the viscous resistance generator 25 and the like. The space A is filled with viscous fluid.

The driven plate 19, which is a disk-shaped element, has its inner circumferential edge coupled to the flywheel 3 by rivets 20. A plurality of window holes 19a are formed at a radially intermediate portion of the driven plate 19, respectively extending in a circular direction. Annular grooves 19b (see FIGS. 1 and 2) for sealing are formed at opposite sides near an outer circumferential edge of the driven plate 19. A plurality of projections 19d extend outward from a circumferential surface 19c of the driven plate 19 in a radial direction.

The coil springs 22 are placed within the window holes 19a in the driven plate 19. Sheet elements 23 are provided at opposite ends of the coil spring 22. The first power input plate 13 and the second power input plate 14 respectively have spring receptacles 13a and 14a in a position corresponding to the window hole 19a of the driven plate 19. The seat elements 23 contact opposite ends of the spring receptacles 13a and 14a in a circular direction. Thus, the power input plates 13 and 14 and the driven plate 19 are elastically coupled in a circular direction with the coil spring 22 interposed between them. The seat element 23, under an idle state as shown in FIG. 2, has its circumference only partially put in contact with the spring receptacles 13a and 14a of the power input plates 13 and 14 and the window hole 19a of the driven plate 19 at their respective ends. In other words, the coil spring 22 is accommodated in torsional contact within the window hole 19a.

The viscous resistance generator 25 will now be described.

The viscous resistance generator 25 is comprised of an annular housing 27 provided at an outermost circumference within the space A, a plurality of pins 28 coupling the housing 27 to the first and second power input plates 13 and 14, and a plurality of slide stoppers 27a formed within the housing 27, the pins 28 extending through the slide stoppers 27a.

The annular housing 27 is placed inside an outer circumferential wall of the second power input plate 14 and has its opposite end surfaces in an axial direction interposed between the power input plates 13 and 14. Within the annular housing 27, there is provided an annular fluid chamber B which is filled with viscous fluid. Within the annular housing 27, the plurality of stoppers 27a divide the annular fluid chamber B into a plurality of arched fluid sub-chambers B1. The pin 28 allows the annular housing 27 to revolve integral with the first and second power input plates 13 and 14. A width of the annular housing 27 which determines viscous resistance depends upon a length of a shank of the pin 28. The annular housing 27 is provided with two opposing annular projections 27b which protrude inwardly at inner ends of the annular housing 27, the projections 27b defining an opening 27e (FIG. 1) and the projections 27b are fitted in the annular grooves 19b formed in the driven plate 19 to seal an inner opening of the annular fluid chamber B. The projection 27b is an engagement portion fitted in the annular grooves 19b formed in the driven plate 19 partakes of load (thrust load, radial load and bending load) caused between a power input system (the first and second power input plates 13 and 14 and the housing 27) and a power output system (the driven plate 19 and the flywheel 3) with the viscous fluid intervening therebetween. The engagement portion and a bearing 17 (described below) provide support between both the input and output systems. Thus, the seal of the annular fluid chamber B also works as a supporter of the load, and this brings about a cost reduction.

Return holes 27c are formed in inner opposite end surfaces of intermediate portions of the housing 27, between the stoppers 27a The return holes 27c permit the viscous fluid to move between the annular fluid chamber B and the inner space A without interruption, as will be explained in greater detail below.

The projections 19d of the driven plate 19 correspond in position to the intermediate portions between the stoppers 27a, and in a torsion free state, are positioned adjacent to the return holes 27c, as shown in FIG. 2.

Within the arched fluid chamber B1, a plurality of cap-like slider 29 are disposed such that the cap-like structure of each slider 29 covers one of the projections 19d of the driven plate 19, as is shown in FIGS. 2, and 5–10. The slider 29 has a curved outer surface fitted in an inner circumference of the annular housing 27, and is slidably disposed for movement in a circular direction within the arched fluid chamber B1. The slider 29 is movable in the circular direction in a range where walls in radial directions stop the projection 19d of the driven plate 19. Legs 29a expands radially inward from four interior corners at an inner circumference of the slider 29, and tips of the legs 29a are in contact with annular projections 27b such that the sliders 29 are confined within the annular housing 27.

Figure 5:
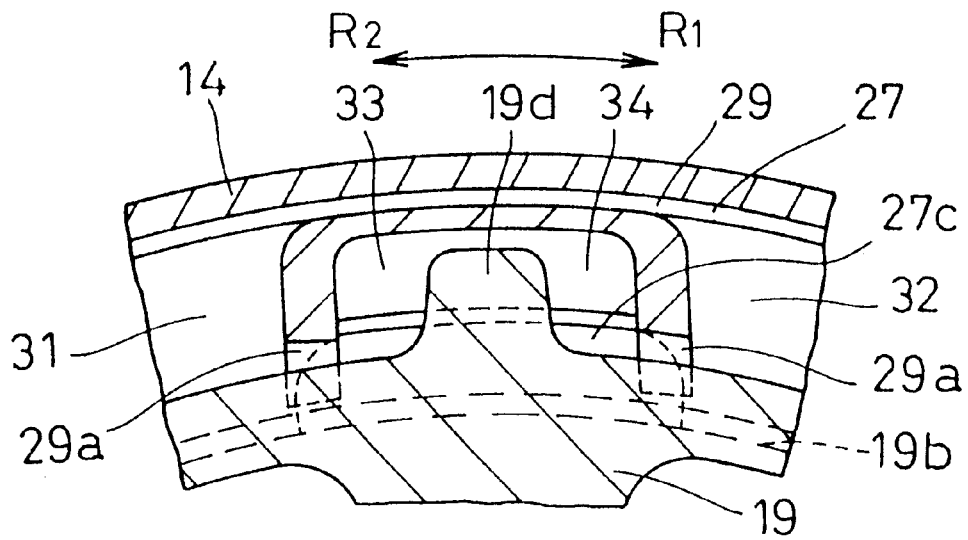
FIG. 5 is a fragmentary, enlarged view of a portion of FIG. 2, showing no relative displacement of several parts of the power transfer apparatus (no torsional stress)
Figure 6:
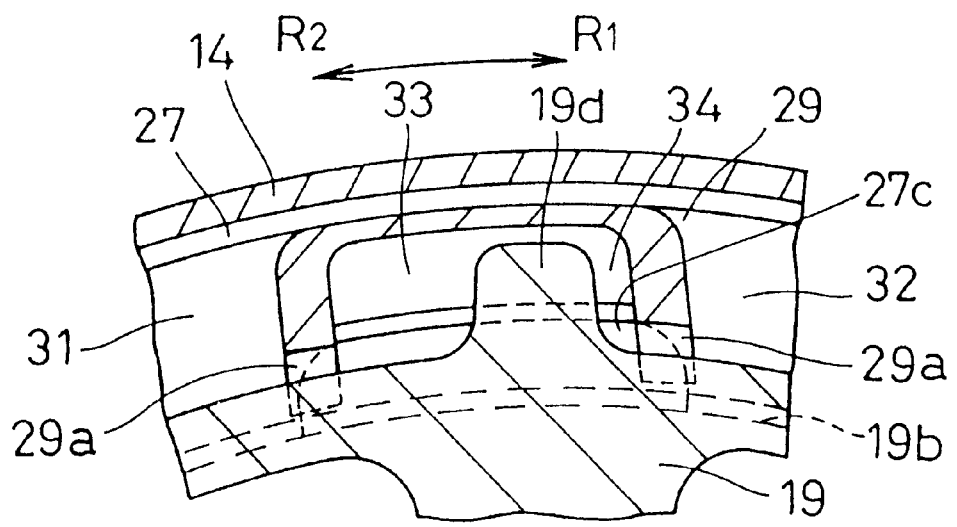
FIG. 6 is a fragmentary, enlarged view of a portion of FIG. 2, similar to FIG. 5, showing relative displacement of several parts of the power transfer apparatus due to torsional stress on the apparatus.

Each of the arched fluid sub-chambers B1 is further divided into a first larger cell 31 in a R2 direction (see FIG. 2) and a second larger cell 32 in an R1 direction by the slider 29. The interior of the slider 29 is divided into a first smaller cell 33 in the R2 direction and a second smaller cell 34 in the R1 direction by the projection 19d of the driven plate 19. As shown in FIGS. 5 and 6, a gap defined between the projection 19d of the driven plate 19 and the slider 29 and the return hole 27c permit the viscous fluid to move from the first smaller cell 33 to the second smaller cell 34 and vice versa. The gap around the leg 29a of the slider 29 in the R2 direction also permits the viscous fluid to move between the first larger cell 31 and the first smaller cell 33 while gap around the leg 29a of the slider 29 in the R1 direction permits the viscous fluid to move between the second smaller cell 34 and the second larger cell 32. When a wall of the slider 29 comes into contact with the projection 19d, however, the viscous fluid is blocked between the inside and outside of the slider 29.

A choke C (see FIGS. 2, 9 and 10) is provided between an inner circumferential surface of the stopper 27a and an outer circumferential surface 19c of the driven plate 19. When the viscous fluid passes the choke C, a large viscous resistance is created.

Figure 4:
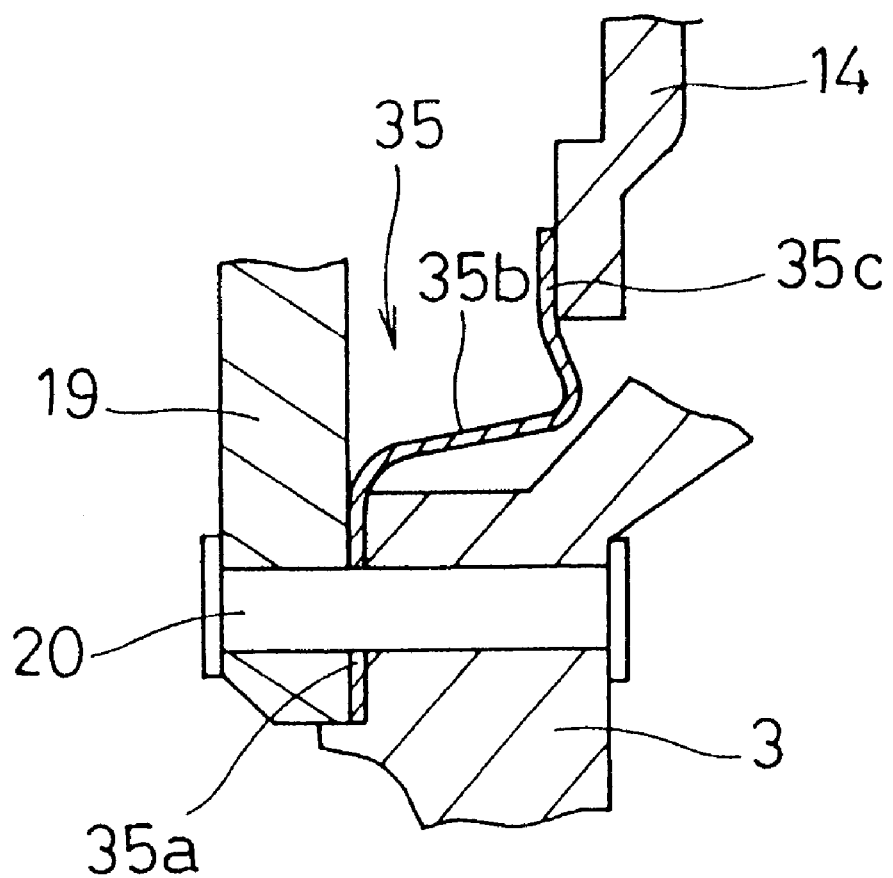
FIG. 4 is a fragmentary, enlarged view of a portion of FIG. 1, on a slightly enlarged scale.

An inner circumference of the driven plate 19 and the second flywheel 3 are fixed to each other by the rivets 20 with a spring seal 35 sandwiched between them, as shown in FIG. 4. The spring seal 35 is an annular ring of thin sheet metal and includes a fixed portion 35a having a plurality of holes through which the rivets 20 are fitted, an outer cylindrical portion 35b extending from the fixed portion 35a toward the transmission, and a resilient portion 35c spreading outward from an outer cylindrical portion 35b. The resilient portion 35c is in contact with an inner circumferential end of the second power input plate 14 on a side close to the engine to urge it toward the transmission. The spring seal 35 seals the fluid space A between the second power input plate 14 and the flywheel 3.

The center hole in the inner circumferential end of the first power input plate 13 is fitted on the boss 15 and fixed by, for instance, welding, as shown in FIG. 1. An outer circumferential surface 15a of the boss 15 close to the engine is fitted in the center hole 2a of the flexible plate 2. The boss 15 is provided with a center hole 15c extending through in an axial direction and a hole 15b extending in a radial direction to lead to the center hole 15c and the fluid space A. A rivet 16 is fitted through the center hole 15c. In assembling the device, the center hole 15c and the hole 15b are utilized to fill the fluid space A with the viscous fluid.

The bearing 17 is placed between an outer circumferential surface of the boss 15 close to the transmission and an inner circumference of the fly wheel 3, and it holds the flywheel 3 rotatably relative to the boss 15. An inner race of the bearing 17 is fixed to the boss 15 by a groove in the boss and a head of the rivet 16. Thus, the bearing 17 as well as the boss 15 is put in position by the center hole 2a of the flexible plate 2. Thus, the flexible plate 2, the boss 15 and the bearing 17 are arranged to each other concentrically.

Since engagement of the annular projection 27b of the housing 27 and the grooves 19 of the driven plate 19 in the viscous resistance generator 25 partakes of the thrust load and the radial load, the load imposed on the bearing 17 can be reduced. Thus, dimensions of the bearing can be reduced in a radial direction, and in this embodiment, for example, the bearing 17 is placed within a pitch circle D of the bolts 6 (see FIG. 2). With the bearing 17 positioned within the pitch circle D of the bolts 6, the inside of the dampening element 4 can be designed with less restriction. Thus, it is possible to design the driven plate 19 such that it extends more inwardly than driven plates in the prior art. Similarly, the coil spring 22 may be provided more inwardly toward the center of the apparatus, as compared to the prior art.

The bearing 17 has seal elements at its opposite ends to seal a gap between the inner race and an outer race. The seal elements tightly seal in lubricant between the inner race and the outer race and seal the fluid space A between the boss 15 and the inner circumference of the flywheel 3.

The flywheel 3 has a friction surface 3a close to the transmission. There lies a projection 3d at an outer circumference of the friction surface 3a, extending toward the transmission. The projection 3d extends circumferentially, and is divided into three segments, as is indicated in FIG. 2. As is shown in FIG. 1, on the inner circumference of the flywheel 3 has near its inner circumference, a radially inwardly projecting flange 3c is formed to engage the outer race of the bearing 17 close to the engine.

The clutch disk assembly 202 includes a clutch disk 205 having friction facing on its opposite sides, an annular plate 206 having its outer circumferential end fixed to an inner circumferential end of the clutch disk 205 by a rivet 206a, and a hub flange 207 having a flange 207a fixed to an inner circumferential end of the annular plate 206 by a plurality of rivets 206. In an inner circumference of the hub flange 207, a spline hole 207b engaging a spline of a main drive shaft 302 is formed.

A clutch coupler 203 is primarily comprised of an annular pressure plate 209 inside the projection 3d, and a diaphragm spring 210. The pressure plate 209 is coupled to the flywheel 3 with a strap plate 211 (FIG. 2) extending between them along a tangential line of a circumference. The diaphragm spring 210 is, as is shown in FIG. 2, includes an annular pressing portion 210a and a plurality of levers 210b radially extending inward from the pressing portion 210a. An outer circumferential end of the pressing portion 210a is supported at its side close to the transmission by a snap ring 215 fixed to an inside of the projection 3d of the flywheel 3. A clutch cover as used in the prior art is omitted herein, and the number of parts is decreased. An inner circumferential end of the pressing portion 210a urges the pressure plate 209 toward the engine. Tips of the levers 210b engage a release device 204.

The release device 204 includes a lever plate 218 contactable with the levers 210b of the diaphragm spring 210, a release bearing 217 fixed to an inner circumference of the lever plate 218, a first cylindrical element 219 to which an inner circumferential end of the release bearing 217 attached, and a second cylindrical element 220 partially inserted in and fixed to the first cylindrical element 219. When the second cylindrical element 220 is moved toward the transmission by a device not shown, the lever plate 218 pulls out the levers 210b of the diaphragm spring 210 toward the transmission to release the pressure plate 209 from the pressing by the diaphragm spring 210.

An operation of the power transfer device will be described below.

When torque is applied from the crank shaft 301 to the flexible plate 2, the ring element 8, the first power input plate 13, the second power input plate 14 and the coil spring 22 transmit the torque to the driven plate 19. The torque transmitted to the driven plate 19 is further transmitted to the flywheel 3 and the clutch disk assembly 202 and then to the main drive shaft 302. Flexural vibration transmitted from the crank shaft 301 to the ring element 8 are suppressed by the flexible plate 2 and generally do not easily reach the dampening element 4. If the flexural vibration is transmitted thereto, the engagement of the annular projection 27b of the housing 27 with the grooves 19b of the driven plate 19 partake in responding to the bending load. Thus, since the load imposed upon the bearing 17 is reduced, the bearing 17 can be downsized in a radial direction.

When the release device 204 is shifted toward the transmission, the pressure plate 209 is released from the pressing by the diaphragm spring 210, and consequently, the clutch disk 205 leaves from the friction surface 3a of the flywheel 3. Although simultaneously release load affects the flywheel 3 to impose thrust load upon the bearing 17, the annular projection 27b of the annular housing 27 and the bearing 17 partake the load applied to the flywheel 3 because the flywheel 3 is fixed by the driven plate 19 and the rivets 20. Thus, since the load imposed upon the bearing 17 is reduced, the bearing 17 can be downsized in a radial direction, and the cost reduced bearing can be obtained.

An operation of the flywheel assembly 1 when torsional vibration is transmitted from the crank shaft 301 to the flywheel assembly 1 will be described. The operation in transmitting the torsional vibration will herein be described where a power input system (the first power input plate 13, the second power input plate 14 and the annular housing 27) experiences torsional stress and where a power output system (the driven plate 19 and the flywheel 3), fixed to other elements not shown, has rotary power transmitted to it.

In the operation of the present invention, examples of both small and large torsional vibration will be discussed. First, small levels of torsional vibration are discussed. A small level of torsional vibration typically causes a small torsional angle of displacement (minute vibration) where the wall of the slider 29 in a circular direction does not come in contact with the projection 19d of the driven plate 19 is transmitted and that the annular housing 27, which is idle as shown in FIG. 5, is distorted toward the R2 direction. In such a situation, the slider 29 moves toward the R2 direction, and as shown in FIG. 6, the first smaller cell 33 expands within the slider 29 while the second smaller cell 34 contracts. The viscous fluid flowing from the second smaller cell 34 to the first smaller cell 33 passes between the outer circumference of the slider 29 and the projection 19d and through the return hole 27c. The viscous fluid passes the return hole 27c to move between the slider 29 and the annular space A with a small fluid flow resistance.

Figure 7:
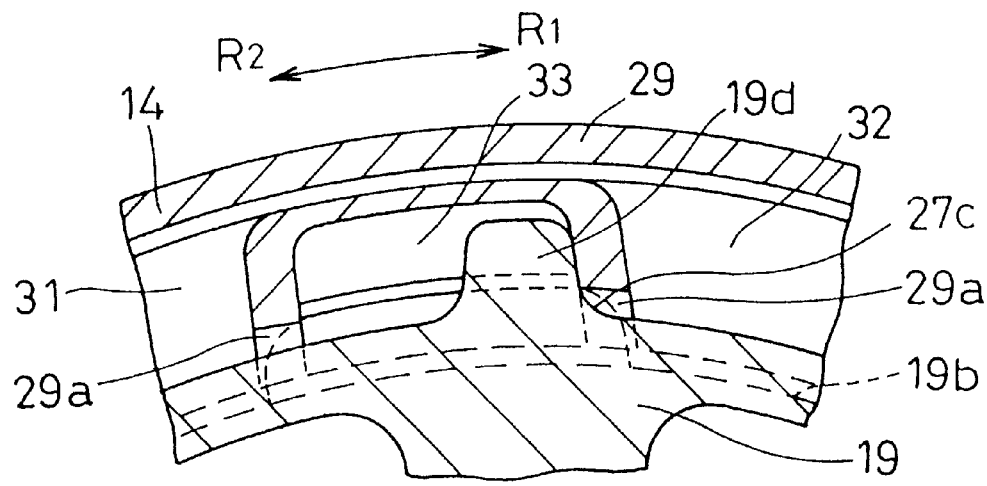
FIG. 7 is a fragmentary, enlarged view of a portion of FIG. 2, similar to FIGS. 5 and 6, showing further relative displacement of several parts of the power transfer apparatus due to torsional stress on the apparatus.
Figure 8:
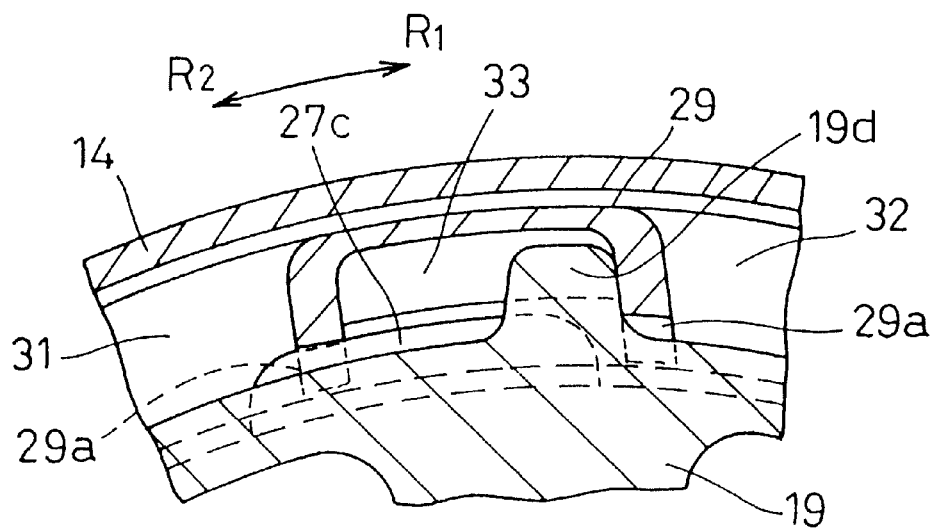
FIG. 8 is a fragmentary, enlarged view of a portion of FIG. 2, similar to FIGS. 5, 6 and 7, showing still further relative displacement of several parts of the power transfer apparatus due to torsional stress on the apparatus.

When the annular housing 27 is continuously displaced from a state as shown in FIG. 6, the wall extending along the circumference close to R1 comes in contact with the projection 19d of the driven plate 19 in the slider 29, as shown in FIG. 7. After that, the slider 29 engages the driven plate 19, and the annular housing 27 and the slider 29 rotates relative to each other. Although the second larger cell 32 and the return hole 27c are conducted to each other in a state as shown in FIG. 7, continuous distortion of the annular housing results in the return hole 27c being stopped up by the projection 19d, as shown in FIG. 8. A similar operation occurs in the event that the annular housing 27 is displaced from an idle state as shown in FIG. 5 in the R1 direction.

Since the sliders 29 and the annular housing 27 do not rotate or are not displaced relative to each other under the minute vibration, the second larger cell 32 does not contract, and the viscous fluid does not pass through the choke C. This means a large viscous resistance does not arise under the minute vibration. The coil spring 22 expands and contracts, torsionally contacts the window hole 19a of the driven plate 19 and the spring receptacles 13a and 14a of the power input plates 13 and 14; and thus the coil spring 22 exhibits a low rigidity. Specifically, under the minute vibration, characteristics of the low rigidity and low viscous resistance can be attained, and they are effective to suppress abnormal sound like clattering sound, heavy sound or the like.

An operation in transmitting torsional vibration of a large torsional angle (referred to as 'grand vibration' hereinafter) will now be described.

Figure 9:
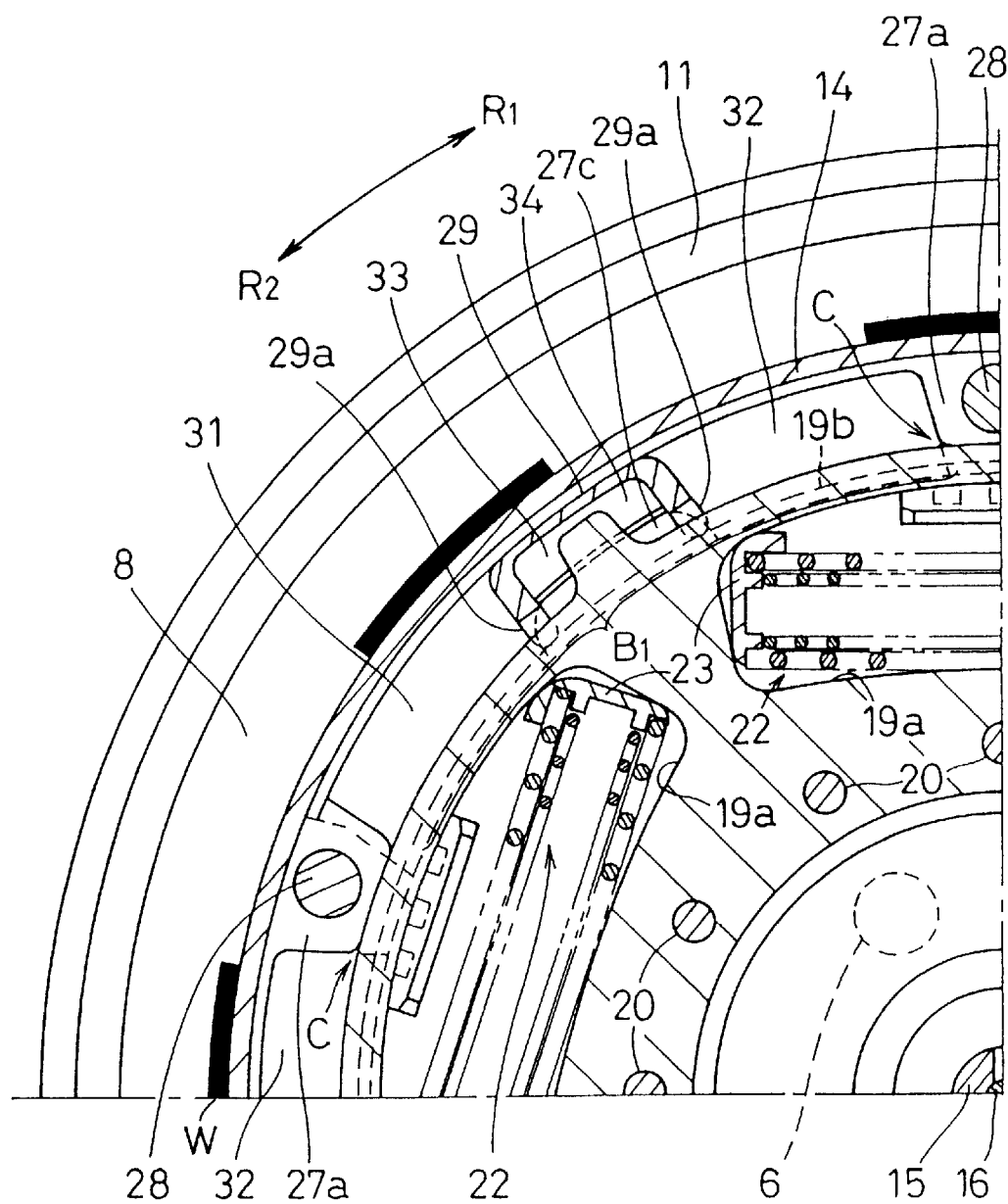
FIG. 9 is a fragmentary section of a portion of FIG. 2, on a slightly enlarged scale, showing the apparatus in a torsion free state with generally no relative displacement between parts of the apparatus.

It is now assumed that the annular housing 27, from a torsion free state, as shown in FIG. 9, experiences torsion and is displaced relative to the driven plate 19 in the R2 direction. Accordingly, the slider 29 is shifted toward R2, and the displacements as are shown with respect to the minute vibration as illustrated in FIGS. 5 to 8 are experienced. When the second larger cell 32 on the side of R2 is sealed because of contact between the slider 29 and the projection 19d of the driven plate 19 as shown in FIG. 8, the second larger cell 32 begins to contract. This results in the viscous fluid in the second larger cell 32 passing the choke C to flow into the arched fluid sub-chamber B1 on the side of R1. When the viscous fluid flows through the choke C, a large viscous resistance is created. The viscous fluid passes the return hole 27c and smoothly flows into the first larger cell 31.

Figure 10:
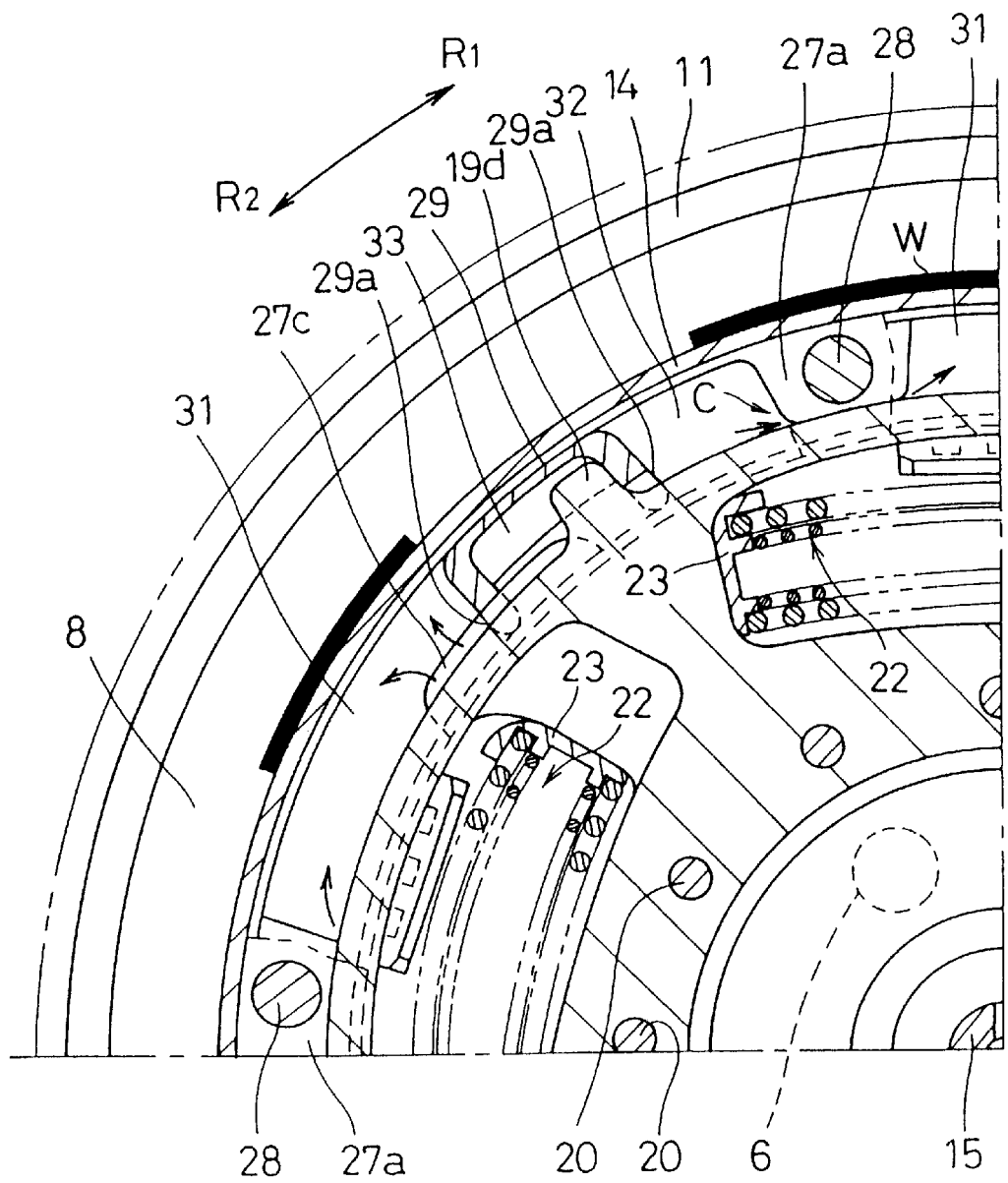
FIG. 10 is a fragmentary section of a portion of FIG. 2, similar to FIG. 9, showing relative displacement of several parts of the power transfer apparatus due to torsional stress on the apparatus.

When the housing 27 is displaced from the position shown in FIG. 10 in the R1 direction, the slider 29 passes by a neutral position (shown in FIG. 9), and displacement reverse to that shown in FIG. 10 is experienced.

As has been described, a large viscous resistance is experienced during a grand vibration. In addition to that, the rigidity is enhanced because a seat element 23 of the coil spring 22 contacts an end of the window hole 19a and ends of the spring receptacles 13a and 14a as the torsional angle becomes larger. Thus, under the grand vibration, characteristics of a high rigidity and a large viscous resistance are obtained, and this effectively dampens vibration upon tip-in-tip-out (large vibration forward and backward of an automobile caused by rapid operation of an accelerating pedal).

It is assumed now that the minute vibration is transmitted under the condition where the annular housing 27 is displaced in the R2 direction by a limited angle relative to the driven plate 19. The slider 29 repeats reciprocal torsional motions relative to the projection 19d in an angular range where the wall in a circular direction of the slider 29 is not in contact with the projection 19d. In such a situation, the viscous fluid does not flow at the choke C nor cause a large viscous resistance. Thus, even with such a condition that the annular housing 27 and the driven plate 19 make a large torsional angle, the minute vibration can be effectively absorbed.

SECOND EMBODIMENT

Figure 11:
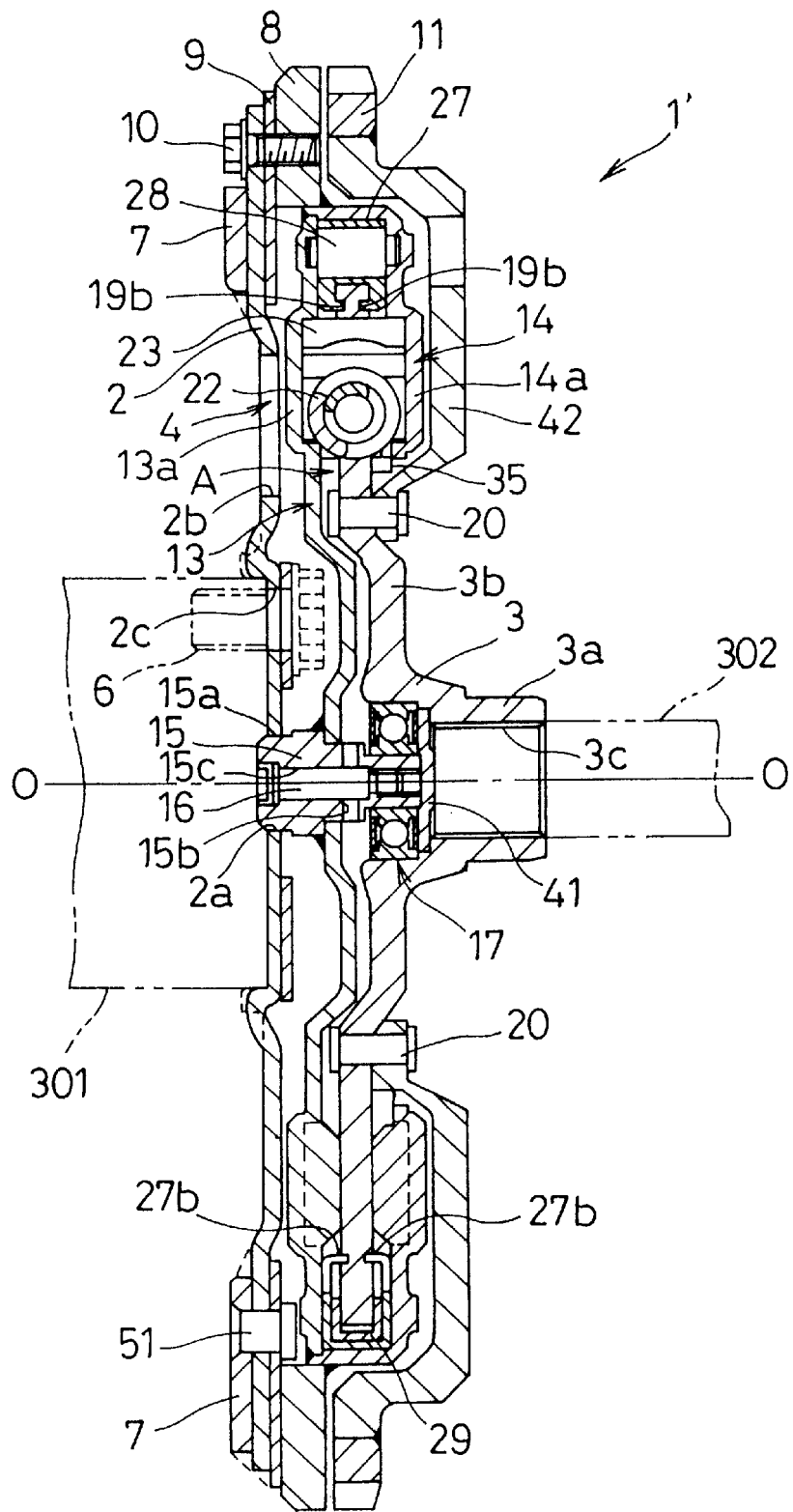
FIG. 11 is a fragmentary, side section, showing a power transfer apparatus in accordance with a second embodiment of the present invention.

FIG. 11 to FIG. 19 show a damper 1' in second embodiment of the present invention. The damper 1' is a device to transmit torque from a crankshaft 301 in the engine to a main drive shaft 302 in a transmission. In FIG. 11, the engine (not shown) is positioned on the left of the figure while the transmission (not shown) is positioned on the right Line O—O in FIG. 1 is a rotation axis line of the damper 1', and R1 in FIG. 2 denotes the direction of rotation of the damper 1'. R2 denotes a direction of displacement of relatively moveable parts, as will be more apparent in the following description.

The damper 1' includes many parts previously described in the first embodiment, although with some modifications, such as a flexible plate 2, a ring element 8 fixed to the flexible plate 2, a hub flange 3, and a dampening element 4 elastically coupling the ring element 8 and the hub flange 3 in a circular direction to dampen torsional vibration between them.

Figure 13:
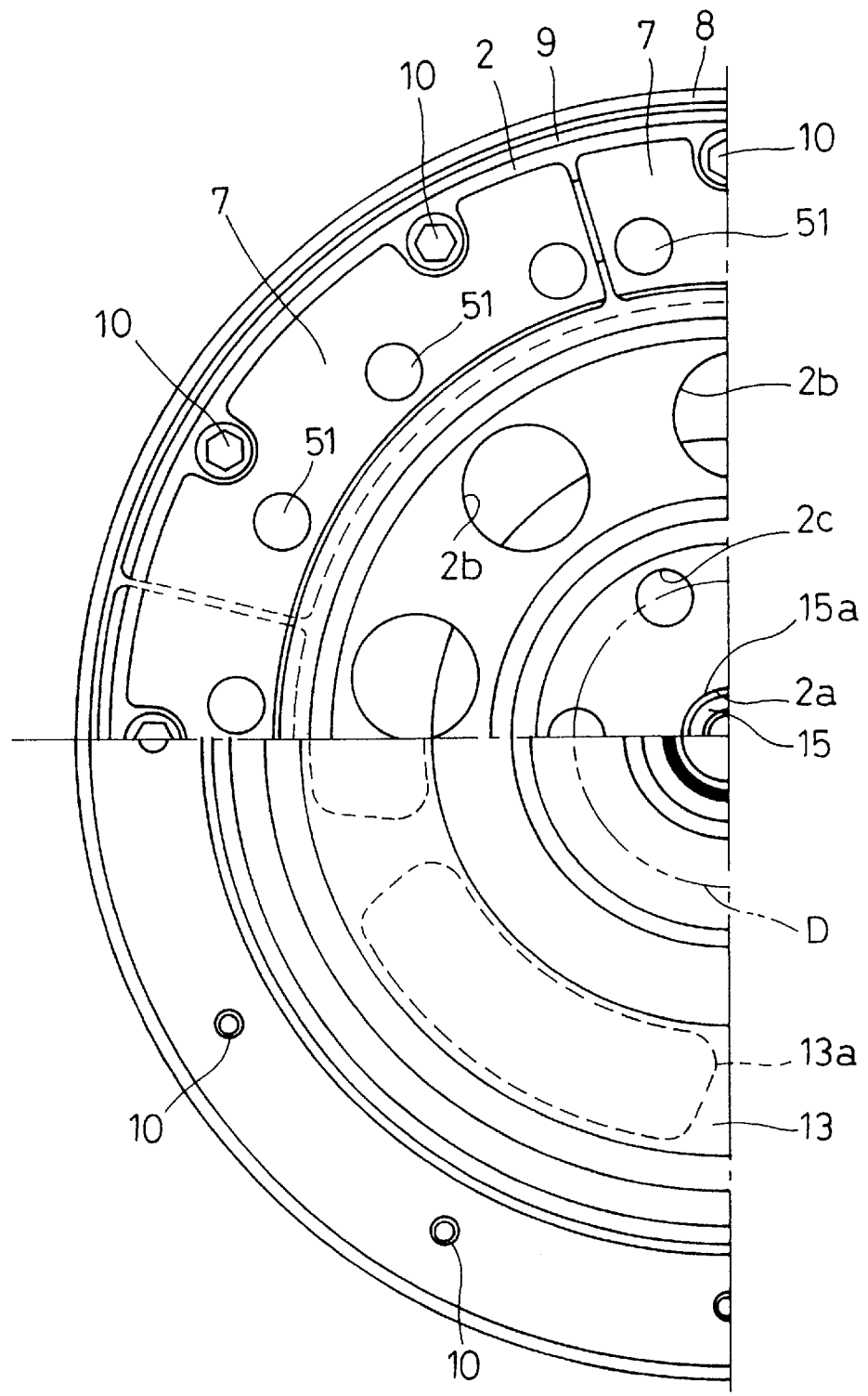
FIG. 13 is a fragmentary, part section, part elevation front view of the apparatus depicted in FIG. 11, as seen from the engine.

The flexible plate 2 is a roughly disk-like element which is capable of flexing in axial directions, but exhibits rigidity in its rotation direction. The flexible plate 2 has a center hole 2a at its center. The flexible plate 2 has a plurality of round holes 2b circularly formed at the same intervals at its intermediate portion in a radial direction. A plurality of bolt holes 2c are formed at the same intervals in a circular direction inward from the round holes 2b. A bolt 6 extending through each bolt hole 2c fix the inner circumferential end of the flexible plate 2 to a tip of a crank shaft 101. To an outer circumference of the flexible plate 2 close to the engine, a plurality of arched inertia elements 7 as shown in FIG. 13 are fixed by rivets 51. The inertial elements 7 causes moment of inertial of the damper 1 to increase. Since the inertial elements are segmented annular elements, they do not prevent the flexible plate 2 from flexing itself in the flexural direction. An outer circumferential end of the flexible plate 2 is fixed to the ring element 8 by a plurality of bolts 10, with a disk-like plate 9 interposed between them. The inertia elements 7 respectively have notches corresponding to the bolts 10.

The hub flange 3 includes a boss 3a and a flange 3b integrally formed at an outer circumference of the boss 3a. At the center of the boss 3a, a spline hole 3c engages with spline teeth of the main drive shaft 302 extending from the transmission. The flange 3b extends radially outwardly to support a dampening element 4, described below.

The flange 3b of the hub flange 3 is provided with an inertial element 42 close to the transmission. The inertial element 42 is a disk-like element covering a second power input plate 14 close to the transmission, and its inner circumferential end is fixed to the flange 3b and the driven plate 19 by rivets 20. With the inertia element 42, moment of inertia of a power output system is increased. Moreover, a ring gear 11 is welded to an outer circumference of the inertia element 42 by welds W. Although the ring gear 11 as used in the prior art is an element welded to the outer circumference of the an element such as a flexible plate (similar to plate 2), it is shifted from a power input system to the power output system to easily increase the moment of inertia of the power output system in this embodiment. When the moment of inertia of the power output system is increased, it is possible to decrease a resonance frequency down to an idling speed (a practical number of revolutions) or below. Since the ring gear 11 is used to increase the moment of inertia of the inertia element 42, it is not necessary to include extra weights or the like on the inertia element, and this leads to a cost reduction.

The damper 1' includes a first power input plate 13, a second power input plate 14, a driven plate 19, a coil spring 22 and a viscous resistance generator 25.

The first power input plate 13 and the second power input plate 14 are sheet metal disk-like elements. An inner circumferential end of the first power input plate 13 extends inward in a radial direction beyond an inner circumferential end of the second power input plate 14. The second power input plate 14 has its outer circumference provided with an outer circumferential wall which extends toward the engine and is fixed to an outer circumferential end of the first power input plate 13. The outer circumferential wall is welded to an inner circumference of the ring element 8. The first power input plate 13 and the second power input plate 14 define a fluid space A which accommodates the driven plate 19, the coil spring 22, the viscous resistance generator 25 and so forth. The fluid space A is filled with viscous fluid.

At an intermediate portion of the plate 19 in a radial direction, a plurality of window holes 19a are formed, extending in a circular direction. Annular grooves 19b for sealing are formed on opposite surfaces of an outer circumferential end of the hub flange 3b. A plurality of projections 19d protrude outward in a radial direction from an outer circumferential surface 19c of the hub flange 3b.

Figure 12:
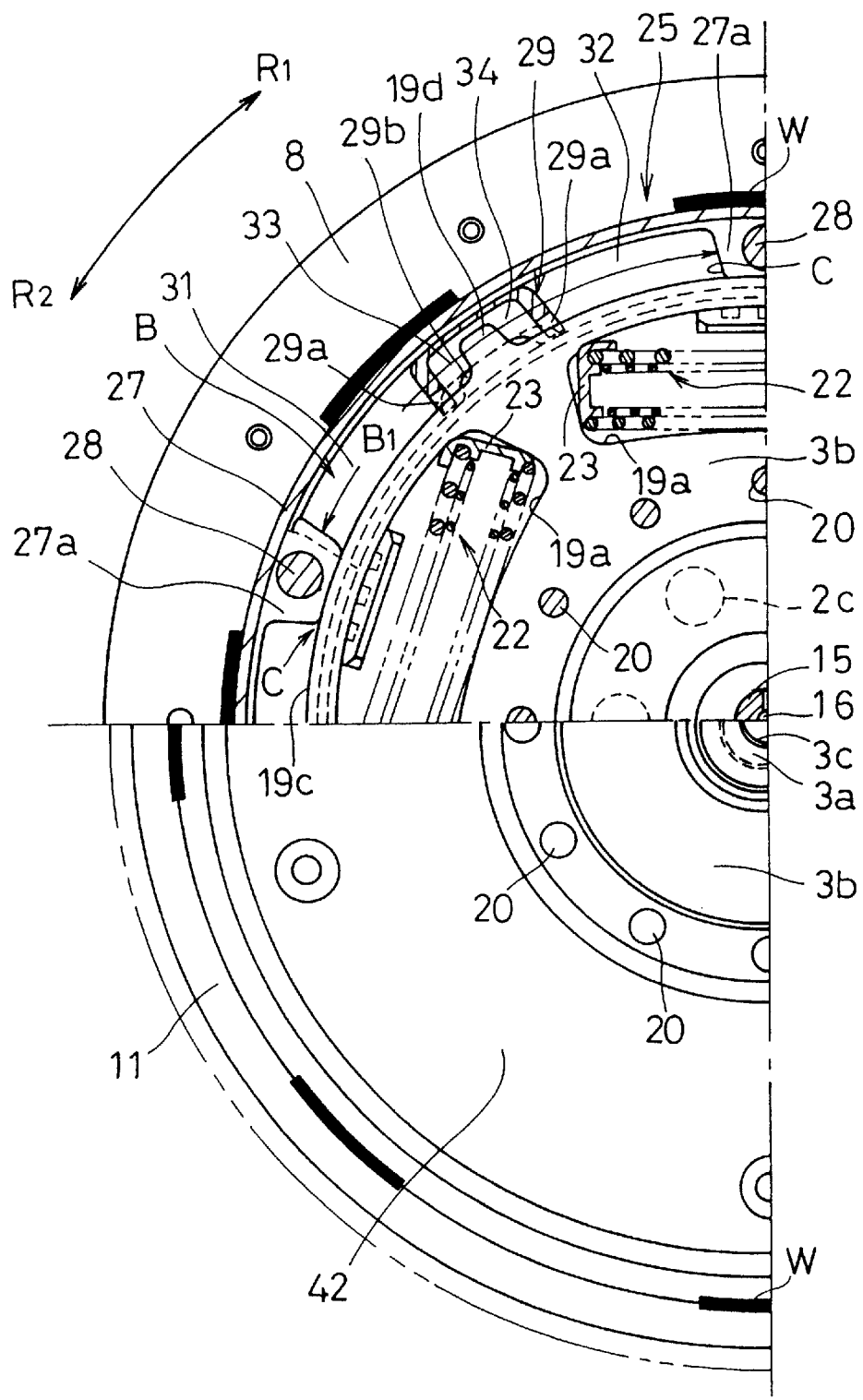
FIG. 12 is a fragmentary, part section, part elevation rear view of the apparatus depicted in FIG. 11, as seen from the transmission.

The coil spring 22 is made up with large and small coil springs placed in the window hole 19a of the hub flange 3b. Seat elements 23 are positioned at opposite ends of the coil spring 22. The first power input plate 13 and the second power input plate 14 respectively have spring receptacles 13a and 14a in a position corresponding to the window hole 19a. Seat elements 23 are in contact with opposite ends of the spring receptacles 13a and 14a in a circular direction. Thus, the first and second power input plates 13 and 14 are elastically coupled in a circular direction to the output plate 19 by the coil spring. In an idle state as shown in FIG. 12, the seat elements 23 have only their respective inner circumferences put in contact with the ends of the spring receptacles 13a and 14a and the end of the window hole 19a. In other words, the coil spring 22 is held in the window hole 19a and the spring receptacles 13a and 14a, being in torsional contact with them.

The viscous resistance generator 25 will now be described.

The viscous resistance generator 25 includes an annular housing 27 placed at an outermost circumference within the fluid space A, a plurality of pins 28 coupling the annular housing 27 to the first and second power input plates 13 and 14, and a plurality of sliders 29 are disposed in the housing 27.

The annular housing 27 is positioned inside an outer circumferential wall of the second power input plate 14, having its opposite surfaces in an axial direction sandwiched by the power input plates 13 and 14. An opening 27e extending in a circular direction is formed in an inner circumference of the annular housing 27, and an outer circumference of the output plate 19 extends into the opening 27e. An annular fluid chamber B which is filled with viscous fluid is formed within the annular housing 27. A plurality of stoppers 27a are integrally formed at spaced apart intervals in a circular direction in the annular housing 27. The stoppers 27a divide the annular fluid chamber B into a plurality of arched fluid sub-chambers B1. The stopper 27a has a hole in which a pin 28 is inserted. The pin 28 has its opposite ends engaged with the power input plates 13 and 14 allowing the annular housing 27 and the power input plates 13 and 14 to rotate as a unitary structure. A width of the annular housing 27, which determines a viscous resistance, depends upon a length of a shank of the pin 28. The annular housing 27 is provided with an annular opposing projections 27b (surrounding the opening 27e) which protrude inward at an inner end of the annular housing 27, and the projections 27b are fitted in the annular grooves 19b formed in one driven plate 19 to seal an inner opening of the annular fluid chamber B. The projections 27b are engagement portions fitted in the annular grooves 19b and partake load (thrust load, radial load and bending load) caused between a power input system (the first and second power input plates 13 and 14 and the housing 27) and a power output system (the hub flange 3) with the viscous fluid intervening therebetween.

Return holes 27c are formed in inner opposite end surfaces of intermediate portions between the stoppers 27a, and the return holes 27c permit the viscous fluid to move between the annular fluid chamber B and the inner space A without interruption.

The projections 19d of the hub flange 3b are positioned adjacent to the return holes 27c, when the damper 1 is in a torsion free or idle state as shown in FIG. 12.

Within the arched fluid sub-chamber B1, a cap-like slider 29 is disposed which covers the projections 19d of the plate 19. The slider 29 has an outer circumferential surface which slidably contacts an inner circumferencial surface of the annular housing 27, and is slidable in a radial direction within the arcuate fluid chamber B1. The movement of the slider 29 confined by the projections 19d. The slider 29 is formed with notches 29a at the opposite end walls on an inner circumference. Additionally, notches 29b are formed at opposite walls of the slider 29 in an axial direction and the inner circumference in a radial direction. Movement of the slider 29 is further confined by stopper 27a. The slider 29 is further confined within the chamber B1 by the annular projections 27b of the annular housing 27.

The slider 29 divides each of the arched fluid chambers B1 into a first larger cell 31 in the R2 direction and a second larger cell 32 in the R1 direction. The interior of the slider 29 is divided into a first smaller cell 33 in the R2 direction and a second smaller cell 34 in R1 direction by the projection 19d of the driven plate 19. The viscous fluid passes through a gap defined between the projection 19d of the driven plate 19 and the slider 29, the notches 29b of the slider 29 and the return hole 27c to flow between the first smaller cell 33 and the second smaller cell 34 without interruption. The viscous fluid passes through the notch 29a of the slider 29 on the side of R2 to flow between the first larger cell 31 and the first smaller cell 33 without interruption while it passes through the notch 29a of the slider 29 on the side of R1 to flow between the second smaller cell 34 and the second larger cell 32 without interruption. When the wall in the circular direction of the slider 29 comes in contact with the projection 19d, however, the viscous fluid is prevented from flowing in and out in a circular direction in the slider 29.

A choke C is defined between an inner circumferential surface of the stopper 27a and an outer circumferential surface 19c of the hub flange 3b. When the viscous fluid passes the choke C, a large viscous resistance arises.

Figure 14:
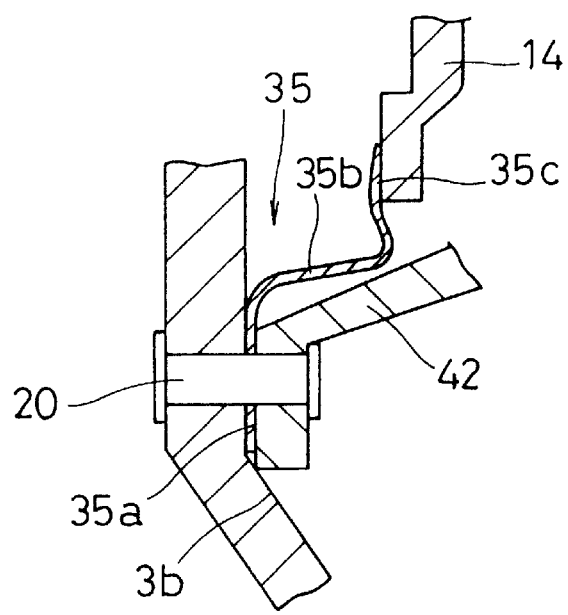
FIG. 14 is a fragmentary section of a portion of FIG. 11, on a slightly enlarged scale.

At a portion where the inertia element 42 is fixed to the flange 3b by the rivet 20, a seal element 35 is sandwiched between the plate 19 and the flange 3b, as shown in FIG. 14. The seal element 35 is made of a thin annular sheet metal and has a fixing element 35a having a plurality of holes through which the rivets 20 extend, an outer cylindrical element 35b extending from an inner circumference of the fixing element 35a toward the transmission, and an urging element 35c extending from the outer cylindrical element 35b to the outer circumference. The urging element 35c contacts an inner circumferential end of the second power input plate 14 close to the engine to urge the inner circumferential end of the second power input plate 14 toward the transmission under the condition as illustrated in FIG. 14. A reaction force caused by urging force by the urging element 35 urges the hub flange 3 toward the engine. The seal element 35 seals the fluid space A between the second power input plate 14 and the hub flange 3.

A center hole at an inner circumferential end of the first power input plate 13 engages the boss 15 and is fixed thereto by means of welding. An outer circumferential surface 15a of the boss 15 close to the engine is fitted in the center hole 2a of the flexible plate 2. Within the boss 15, a center hole 15c and a hole 15b in a radial direction which conducts to the center hole 15c and the fluid space A. A rivet 16 is inserted in the center hole 15c to seal the hole. In assembling the device, the center hole 15c and the hole 15b are used to fill or discharge the viscous fluid in the fluid space A.

A bearing 17 is provided between an outer circumferential surface of the boss 15 close to the transmission and an inner circumference of a boss 3a of the hub flange 3. The bearing 17 supports the boss 15 and the hub flange 3 rotatably relative to each other. A disk-like element 41 is disposed adjacent to the bearing 17 close to the transmission.

An inner race of the bearing 17 is fixed to a groove of the boss 15. In this way, the bearing 17 as well as the boss 15 is positioned in or around a center hole 2a of the flexible plate 2. Consequently, the flexible plate 2, the boss 15 and the bearing 17 are retained in an enhanced concentric arrangement. In this embodiment, an engagement of the annular projection 27b of the annular housing 27 with the grooves 19b of the hub flange 3b partakes of load caused between a power input system and a power output system in the viscous resistance generator 25, and thus, the load imposed upon the bearing can be reduced. This leads to downsizing the bearing 17 in a radial direction and reducing a cost. The bearing 17 is positioned within a pitch circle D (FIG. 12) of the clank bolts 6. This allows the inside of the dampening element 4 to be designed with less space restriction when compared to the prior art; for example, the coil spring 22 can be put more inward, and a space required for the rotation of a head of the crank bolt 16 can be easily retained.

The bearing 17 has a pair of seal elements which seal between the inner race and an outer races. The seal element seals in lubricant between the inner race and outer race and seals the fluid space A between the boss 15 and an inner circumference of the hub flange 3.

The hub flange 3 is urged toward the engine by the seal element 35, as previously mentioned, and this applies preload to the bearing 17. As can be seen, the seal element 35 is a single component which has several functions like sealing the fluid space A, applying the preload to the bearing 17 and the like. This leads to a decrease in the number of components and a reduction of a fabrication cost. Since the seal element 35 is made of sheet metal, the cost is further reduced.

An operation of this embodiment will be described below.

When the torque is applied from the crank shaft 101 to the flexible plate 2, the ring element 8, the power input plates 13 and 14 and the coil spring 22 transmit it to the hub flange 3, and then the main drive shaft 102 further transmits the torque toward the transmission. Torsional vibration derived from the torque transmitted from the crank shaft 101 to the ring element 8 is partially absorbed by the flexible plate 2 so as not to be fully transmitted to the dampening element 4. Even if the torsional vibration is transmitted, the bearing 17 and the engagement of the annular projection 27b of the annular housing 27 with the grooves 19b of the driven plate 19 partake bending load. Thus, since the load applied to the bearing 17 is reduced, the bearing 17 can be downsized in a radial direction.

Then, an operation in the event that torsional vibration has been transmitted from the crank shaft 101 to the damper 1 will be described below. The operation in the following description is directed to torque transmitted from a power input system (the first power input plate 13, the second power input plate 14 and the annular housing 27) to a power output system (hub flange 3) where relatively displaceable parts are displaced to absorb vibration.

Figure 15:
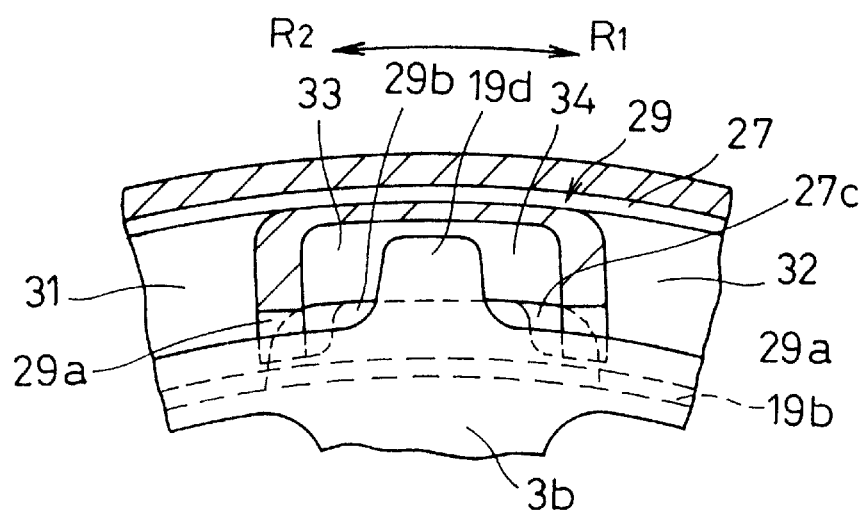
FIG. 15 is a fragmentary section of a portion of FIG. 12, on a slightly enlarged scale, showing no relative displacement of several parts of the power transfer apparatus (no torsional stress)
Figure 16:
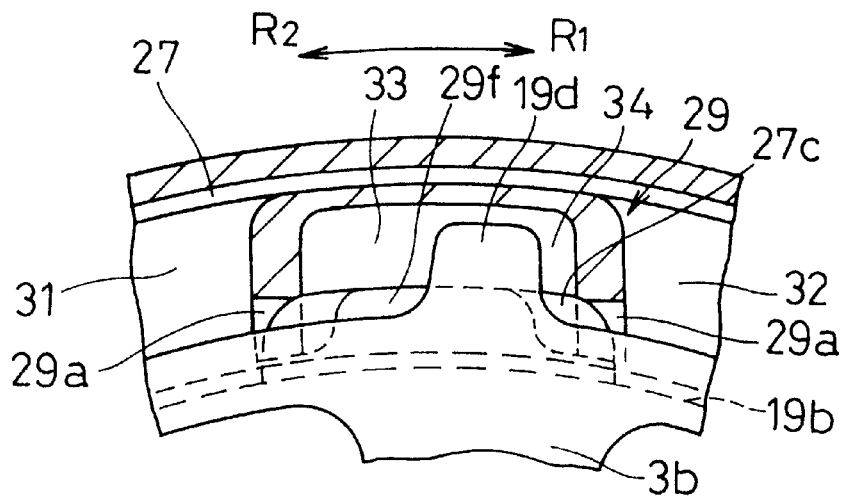
FIG. 16 is a fragmentary, enlarged view of a portion of FIG. 12, similar to FIG. 15, showing relative displacement of several parts of the power transfer apparatus due to torsional stress on the apparatus.

When small levels of torsional vibration are experienced by the damper 1' (referred to as 'minute vibration' hereinafter), a small torsional angle of displacement is observed by the relatively movable parts in the damper. For instance, in a minute vibration a wall of the slider 29 in a circular direction does not come into contact with the projection 19d of the driven plate 19, but none the less, the power input plates 13 and 14 are displaced in the R2 direction from the idle state as shown in FIG. 15. This displacement causes the slider 29 to move in the R2 direction with respect to the plate 19, and the first smaller cell 33 expands within the slider 29 while the second smaller cell 34 contracts, as shown in FIG. 16. The viscous fluid passes the outer circumference of the slider 29 and the projection 19d, the notch 29b and the return hole 27c to flow without interruption, and it also pass the return hole 27c to flow between the slider 29 and the fluid space A without interruption.

Figure 17:
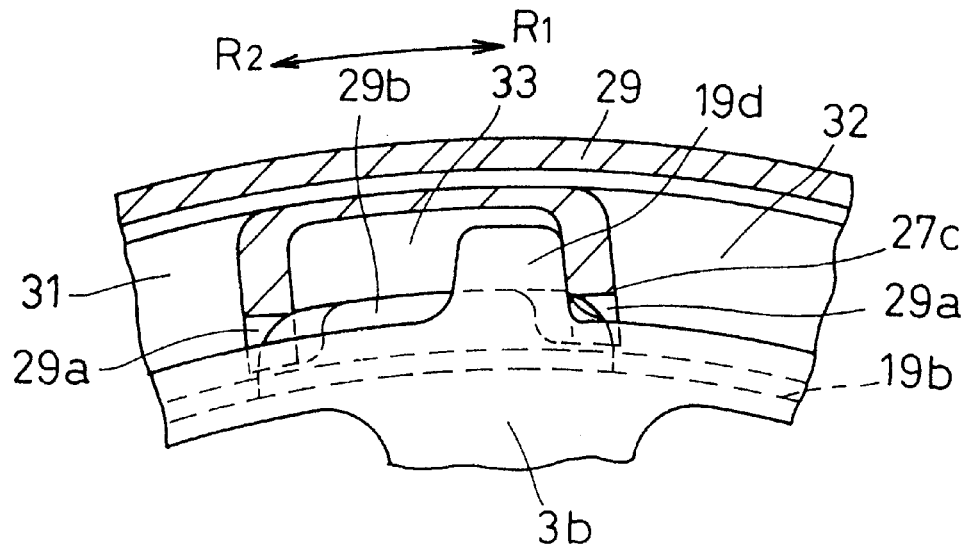
FIG. 17 is a fragmentary, enlarged view of a portion of FIG. 12, similar to FIGS. 15 and 16, showing further relative displacement of several parts of the power transfer apparatus due to torsional stress on the apparatus.
Figure 18:
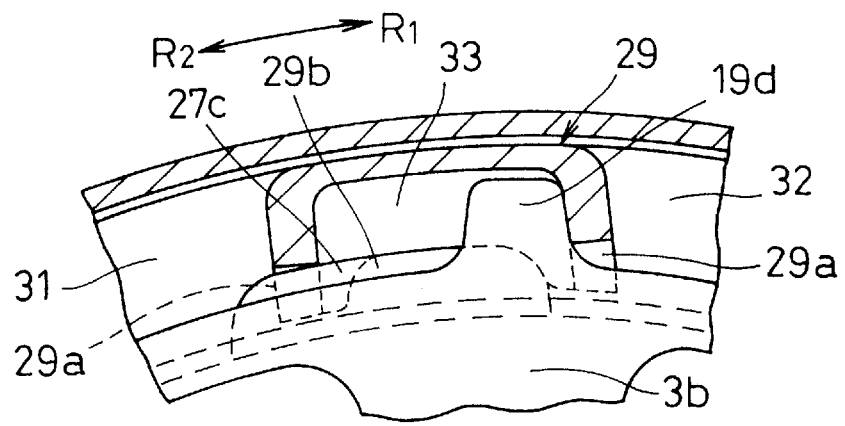
FIG. 18 is a fragmentary, enlarged view of a portion of FIG. 12, similar to FIGS. 15, 16 and 17, showing still further relative displacement of several parts of the power transfer apparatus due to torsional stress on the apparatus.

When torsional motions continue from the state as illustrated in FIG. 16, the wall of the slider 29 in a circular direction on the side of R1 comes soon in contact with the projection 19d of the flange 3b, as shown in FIG. 17. After that, the slider 29 engages the driven plate 19, and the annular housing 27 and the slider 29 are displaced relative to each other. The second larger cell 32 and the return hole 27c are in fluid communication with each other in the state shown in FIG. 17, but continuous torsional displacement makes the projection 19d seal the return hole 27c, as is shown in FIG. 18.

An operation similar to that mentioned above is performed when the annular housing 27 is displaced in the R1 direction from the idle state as shown in FIG. 15.

Under the minute vibration, the slider 29 and the annular housing 27 do not rotate relative to each other, and therefore, the viscous fluid does not pass the choke C. This means a large viscous resistance does not arise during the minute vibration. Under the minute vibration, additionally, the coil spring 22 expands or contracts partially pushed against the window hole 19a of the flange 3b and the spring receptacles 13a and 14a of the power input plates 13 and 14; and thus, a low rigidity is attained. Specifically, under the minute vibration, characteristics of the low rigidity and low viscous resistance can be attained, and they are effective to suppress abnormal sound like clattering sound, heavy sound or the like.

An operation in transmitting torsional vibration of a large torsional angle (referred to as 'grand vibration' hereinafter) will now be described.

Figure 19:
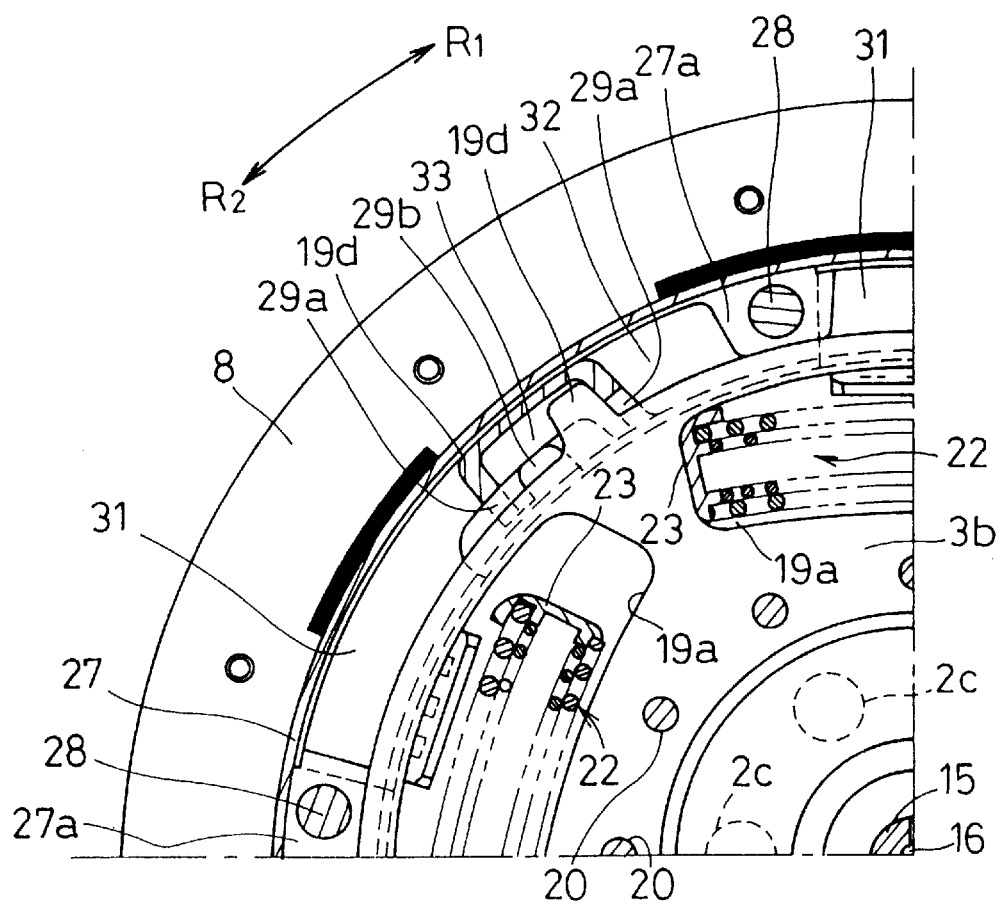
FIG. 19 is a fragmentary section of a portion of FIG. 12, showing relative displacement of several parts of the power transfer apparatus due to torsional stress on the apparatus.

It is now assumed that the annular housing 27 from the idle state as shown in FIG. 12 is displaced relative to the driven plate 19 in the R2 direction. Accordingly, the slider 29 is shifted toward R2, and the displacements proceed as described above with respect to the minute vibration as illustrated in FIGS. 15 to 18. When the second larger cell 32 on the side of R2 is sealed between the slider 29 and the projection 19d of the flange 3b as shown in FIG. 18, the second larger cell 32 begins to contract. This results in the viscous fluid in the second larger cell 32 passing the choke C to flow into the arcuate fluid sub-chamber B1 in the R1 direction (FIG. 19). When the viscous fluid flows through the choke C, a large viscous resistance is experienced. The viscous fluid passes the return hole 27c and smoothly flows into the first larger cell 31. Thus, the annular fluid chamber B is always filled with sufficient amount of the viscous fluid.

When displaced from the stare as illustrate in FIG. 19 in the R1 direction, the annular housing 27 passes by an intermediate position to perform reverse displacement operation to that in FIG. 19.

As has been described, a large viscous resistance is obtained under the grand vibration. In addition to that, the rigidity is enhanced because the seat element 23 of the coil spring 22 contacts an end of the window hole 19a and ends of the spring receptacles 13a and 14a of the power input plates 13 and 14 as the torsional angle becomes larger. Thus, under the grand vibration, characteristics of a high rigidity and a large viscous resistance are obtained, and this effectively dampens vibration upon tip-in-tip-out (large vibration forward and backward of an automobile caused by rapid operation of an accelerating pedal).

It is assumed now that the minute vibration is transmitted under the condition that the annular housing 27 is distorted toward R2 by a specified angle relative to the hub flange 3. The slider 29 repeats reciprocal torsional motions to the projection 19d in an angular range where the wall in a circular direction of the slider 29 does not come in contact with the projection 19d. In such a situation, the viscous fluid does not flow at the choke C nor cause a large viscous resistance. Thus, even with such a condition that the annular housing 27 and the hub flange 3 make a large torsional angle, the minute vibration can be effectively absorbed.

In this embodiment, the flange 3b of the hub flange 3 extends toward the outer circumference engaging the dampening element 4. Thus, the large driven plate typically used in the prior art can be omitted to simplify the configuration, and this leads to a cost reduction. Moreover, since an outer circumferential end of the flange 3b engages the viscous resistance generator 25, the above-mentioned effect is reinforced. Furthermore, since the outer circumference of the flange 3b is inserted in the annular fluid chamber B, the above-mentioned effect is increasingly reinforced.

THIRD EMBODIMENT

Figure 20:
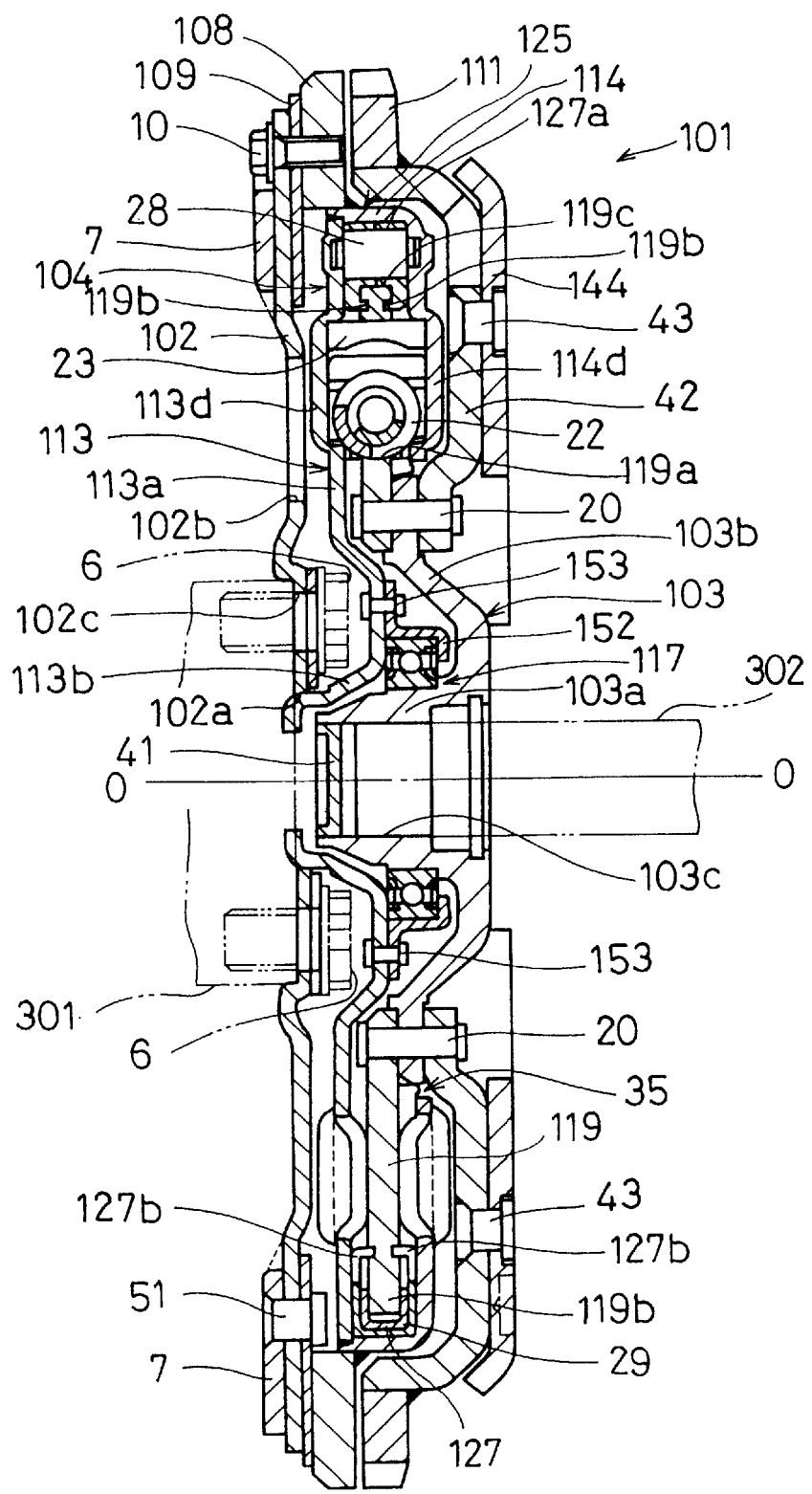
FIG. 20 is a fragmentary, side section schematic diagram showing a power transfer apparatus in accordance with a third embodiment of the present invention.

FIG. 20 shows a damper 101 in accordance with a third embodiment of the present invention. The damper 101 is a device which transmits torque from a crankshaft 301 in an engine to a main drive shaft 302 in a transmission to dampen torsional vibration. In FIG. 20, the engine (not shown) is positioned on the left of the drawing while the transmission (not shown) is positioned on the right Line O—O in FIG. 20 is an axial line of rotation by the damper 101.

The damper 101 primarily includes a flexible plate 102, a ring element 108 fixed to the flexible plate 102, a hub flange 103, and a dampening element 104 elastically coupling the ring element 108 and the hub flange 103 in a circular direction to dampen torsional vibration between them.

The flexible plate 102 is a roughly disk-like element which is flexible in axial directions and is generally rigid in a radial direction. The flexible plate 102 has a center hole 102a at its center. The flexible plate 102 has a plurality of window holes 102b formed at spaced apart intervals in the circular direction in an intermediate portion in a radial direction. A plurality of bolt holes 102c are formed at the same intervals in the circular direction inward from the window holes 102b. A bolt 6 extending through each of the bolt holes 102c fix an inner circumferential end of the flexible plate 102 to a tip of the crankshaft 301. Moreover, an outer circumference of the flexible plate 102 close to the engine, a plurality of arcuate inertial elements 7 are fixed by rivets 51. The inertia elements 7 are useful to increase moment of inertia of the damper 101. The inertia elements 7 are respectively shaped by dividing an annular element into sections in the circular direction, and thus, flexibility of the flexible plate 102 in a bending direction is assuredly retained.

An outer circumferential end of the flexible plate 102 is fixed to the ring element 108 by a plurality of bolts 10 with a disk-shaped plate 109 interposed between them. The inertia elements 7 respectively have notches corresponding to the bolts 10. The hub flange 103 is made up with a boss 103a and a flange 103b integrally formed along an outer circumference of the boss 103a. The boss 103a extends toward the engine and is provided at its center with a spline hole 103c which meshes with spline teeth formed in the main drive shaft 302 extending from the transmission. A cap-shaped element 41 is fixed at a center hole of the boss 103a close to the engine to stop up the hole.

The dampening element 104 primarily includes a first power input plate 113, a second power input plate 114, a driven plate 119, a coil spring 22 and a viscous resistance generator 125.

The first power input plate 113 and the second power input plate 114 are disk-like sheet metal elements. The first power input plate 113 is comprised of a disk element 113a and a hollow cap 113b protruding from a center of the disk element 113a toward the engine. The hollow cap 113b is drawn from the center of the disk element 113a to shape in a unitary fashion. The second power input plate 114 has its outer circumference extending toward the engine, and it has a cylindrical wall fixed to an outer circumferential end of the first power input plate 113. The cylindrical wall is welded to an inner circumference of the ring element 108. The first power input plate 113 and the second power input plate 114 define a fluid space A (not shown in FIG. 20, but the space A is similar to that in previously described embodiments) accommodating a driven plate 119, a coil spring 22, a viscous resistance generator 125 and so forth. The fluid space A is filled with viscous fluid.

The driven plate 119 is a disk-like element, having its inner circumferential end coupled to the flange 103b of the hub flange 103 by a plurality of rivets 20. A plurality of window holes 119a extending in a circular direction are formed in an intermediate portion of the driven plate 119 in a radial direction. Moreover, annular grooves 119b are formed on opposite surfaces of an outer circumferential end of the driven plate 119. A plurality of projections 119b expand outward in a radial direction from an outer circumferential surface 119c of the driven plate 119.

The coil spring 122 is a combination of small and large coil springs and is put in the window hole 119a of the driven plate 119. Seat elements (not shown) are placed at opposite ends of the coil spring 122. The first and second power input plates 113 and 114 are respectively provided with spring receptacles 113d and 114d corresponding in position to the window hole 119a of the driven plate 119. The seat elements come in contact with opposite ends of the spring receptacles 113d and 114d in a circular direction, respectively. In this way, the first and second power input plates 113 and 114 are elastically coupled to each other in the circular direction with the coil spring 122 intervening between them. The coil spring 122 is housed in the window hole 119a and the spring receptacles 113a and 114a, being partially pushed against them.

The viscous resistance generator 125 will be described below. The viscous resistance generator 125 has an annular housing 127 positioned in an outermost circumference within the fluid space A, a plurality of pins 28 connecting the annular housing 127 to the first and second power input plates 113 and 114, and a plurality of slider (not shown, but similar to that described in previous embodiments) arranged within the housing 127. The sliders divide the annular fluid chamber B (not shown, but similar to that described in previous embodiments) into a plurality of arched fluid sub-chambers. The stoppers respectively have the holes through which the pins 28 extend.

The annular housing 127 is positioned inside an outer circumferential wall of the second power input plate 114 and is interposed at its opposite end surfaces in an axial direction between the power input plates 113 and 114. An opening extending in the circular direction is formed at an inner circumference of the annular housing 127, and an outer circumference of the driven plate 119 extends into the opening. Each of the pins 28 has its opposite ends engages with the first and second power input plates 113 and 114, respectively, so as not to rotate by itself. This permits the annular housing 127 and the power input plates 113 and 114 rotate as a unity. A width of the annular housing 127 which determines a viscous resistance depends upon a length of a shank of the pin 128.

In an inner end of the annular housing 127 in a radial direction, opposing annular projections 127b (surrounding the opening mentioned above) which protrudes inward at an inner end of the annular housing 127 in the radial direction, and the projections 127b are fitted in annular grooves 119b formed in the driven plate 119 to seal an inner opening of the annular fluid chamber B. The projection 127b is an engagement portion fitted in the annular grooves 119b formed in the driven plate 119 and partakes of load (thrust load, radial load and bending load) caused between a power input system (the first and second power input plates 113 and 114 and the housing 127) and a power output system (the driven plate 119 and the hub flange 103) together with a bearing 117, described below, with the viscous fluid intervening therebetween.

The present embodiment also includes a number of features that may not be shown in FIG. 20, but are shown and described in the previous embodiments, such as return holes 27c, projections 119d (which correspond to projections 19d in previous embodiments), a cap-like slide 29. Configuration of the slider 29 and a viscous fluid element 125 are generally the same as those of the slider 29 and the viscous resistance generator 125 in the above Embodiment 1.

An inner circumference of the driven plate 119 and the flange 103b of the hub flange 103 are fixed to each other by the rivets 20 with a spring seal 35 sandwiched between them. The spring seal 35 is generally the same as the spring seal described with respect to FIGS. 4 and 14 above.

The boss 113b of the first power input plate 113 is inserted in the hole 102a of the flexible plate 102. Thus, the first power input plate 113 is positioned by the flexible plate 102.

The bearing 117 is placed between an inner circumference of the disk element 113a of the first power input plate 113 and an outer circumference of the boss 103a of the hub flange 103. The bearing 117 has its outer race fixed to the first power input plate 113 by an annulus fixing element 152 and a rivet 153. The boss 103a is inserted inside an inner race of the bearing 117 and partially comes in contact with an end surface of the inner race close to the transmission. In this way, the first power input plate 113 is positioned in the center hole 102a of the flexible plate 102 and supports the bearing 117. This allows the flexible plate 102, the first power input plate 113, the bearing 117 and the hub flange 103 to lie in a generally concentric arrangement.

In this embodiment, the bearing 117 is placed within a pitch circle of bolts 6 fixing the flexible plate 102 to the crankshaft 301, and the inside of the dampening element 104 can be designed with less restriction. For example, the driven plate 119 may expand toward the inner circumference or the coil spring 22 may be placed more inward. A space for rotations of a head of the bolt 6 can be retained The bearing 117 has a seal element between the inner race and the outer race at its opposite end surfaces. This seal element seals in lubricant between the inner race and the outer race and seals the fluid space A between the inner circumference of the first power input plate 113 and the boss 103a of the hub flange 103.

The hub flange 103 is urged toward the engine by the spring seal element 135, as previously mentioned. The hub flange 103 applies force toward the engine to the bearing 117 to impose preload upon it As can be seen, the seal element 35 is a single component which has several functions like sealing the fluid space A, applying the preload to the bearing 17 and the like. This leads to a decrease in the number of components and a reduction of a fabrication cost. Since the seal element 35 is made of sheet metal, the cost is further reduced.

Also, in this embodiment, the boss 103a of the hub flange 103 is inserted in the hollow cap 113b of the first power input plate 113. This allows the damper 101 to reduce the total dimension in an axial direction. Additionally, since the bearing 117 is positioned between the inner circumference of the first power input plate 113 and the outer circumference of the boss 103a, the bearing 117 can be further downsized in a radial direction. This also brings about a cost reduction.

A first inertia element 142 is provided on the flange 103b of the hub flange 103 close to the transmission. The first inertial element 142 is a disk-like element covering the second power input plate 114 close to the transmission and has its inner circumferential end fixed to the flange 103b and the driven plate 119. A second inertia element 144 is fixed to the first inertia element 142 close to the transmission by a rivet 143. The second inertial element 144 is a disk-like element which comes in contact with the first inertial element 142 close to the transmission. The first and second inertial elements 142 and 144 are useful to increase moment of inertia of the power output system. A ring gear 111 to start the engine is welded to an outer circumference of the first inertia element 142. The ring gear 111 is shifted from the power input system to the power output system as in this embodiment to increase a inertial moment ratio of the power output system can be easily increased. When the inertial moment ratio of the power output system is increased, it is possible to decrease a resonance frequency down to an idling speed (a practical number of revolutions) or below in a drive system including the damper 101. With the ring gear 111 positioned as in the current embodiment, a cost reduction is attained as compared to the prior art.

The operation of the damper is almost the same as that in the above Embodiment 2, and therefore description of the operation is omitted.

FOURTH EMBODIMENT

Figure 21:
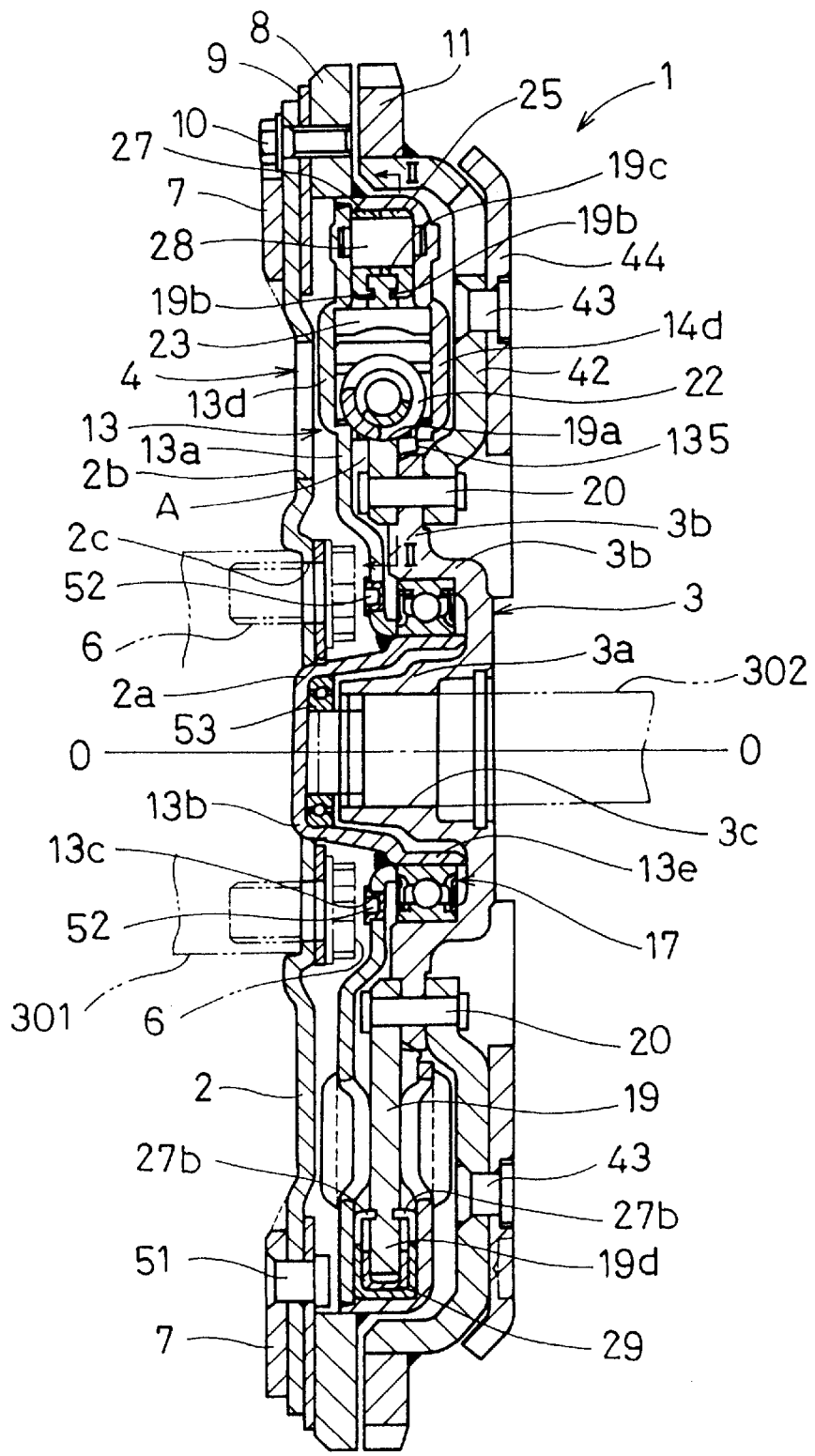
FIG. 21 is a fragmentary, side section schematic diagram showing a power transfer apparatus in accordance with a fourth embodiment of the present invention.

FIG. 21 shows a damper 1 in a fourth embodiment of the present invention. The damper 1 is a device which transmits torque from a crankshaft 301 in an engine to a main drive shaft 302 in a transmission to dampen torsional vibration. In FIG. 21, the engine (not shown) is placed on the left of the drawing while the transmission (not shown) is placed on the right. Line O—O in FIG. 21 is an axial line of rotation by the damper 1. R1 in FIG. 2 denotes the direction of the rotation by the damper 1 (clockwise).

The damper 1 primarily includes a flexible plate 2, a ring element 8 fixed to the flexible plate 2, a hub flange 3, and a dampening element 4 elastically coupling the ring element 8 and the hub flange 3 in a circular direction to dampen torsional vibration between them.

The flexible plate 2 is a roughly disk-like element which is flexible in axial directions and is generally rigid in a circular direction. The flexible plate 2 has a center hole 2a at its center. The flexible plate 2 has a plurality of window holes 2b formed at the same intervals in the circular direction in intermediate portions in a radial direction. A plurality of bolt holes 2c are formed at the same intervals in the circular direction inward from the window holes 2b. A bolt 6 extending through each of the bolt holes 2c fixes an inner circumferential end of the flexible plate 2 to a tip of the crankshaft 301. Moreover, in an outer circumference of the flexible plate 102 close to the engine, a plurality of arched inertial elements 7 are fixed by rivets 51. The inertia elements 7 are useful to increase moment of inertia of the damper 1. The inertia elements 7 are respectively shaped by dividing an annular element into sections in the circular direction, and thus, flexibility of the flexible plate 2 in a flexural direction is assuredly retained.

An outer circumferential end of the flexible plate 102 is fixed to the ring element 8 by a plurality of bolts 10 with a disk-shaped plate 9 interposed between them. The inertia elements 7 respectively have notches corresponding to the bolts 10.

The hub flange 3 is made up with a boss 3a and a flange 3b integrally formed along an outer circumference of the boss 3a. The boss 3a extends from the flange 3b toward the engine and is provided at its center with a spline hole 3c which meshes with spline teeth of the main drive shaft 302 extending from the transmission. The flange 3b has its intermediate portion in a radial direction cylindrically protruding toward the engine, and it still expands from a distal end of a cylindrical portion toward the outer circumference.

The dampening element 4 primarily includes a first power input plate 13, a second power input plate 14, a driven plate 19, a coil spring 22 and a viscous resistance generator 25.

The first power input plate 13 is comprised of a disk element 13a and a center cap 13b welded to the center of the disk element 13a. In an inner circumference of the disk element 13a, there lie a plurality of holes 13c. A cap 52 is fitted in each of the holes 13c which are arranged close to an outer race of a bearing 17 mentioned later. The cap 52 is pull out from the hole 13c to fill or discharge a fluid space A with viscous fluid, as is mentioned below. An inner circumferential end of the disk element 13a is bent toward the transmission and welded to a center cap 13b. In such a condition, the center cap 13b has a cylindrical portion 13e expanding further from the disk element 13a toward the transmission. The center cap 13b close to the engine is fitted in the center hole 2a of the flexible plate 2.

The second power input plate 14 has in its outer circumference a cylindrical wall fixed to the outer circumferential end of the first power input plate 13. The cylindrical wall is welded to an inner circumference of the ring element 8. The first power input plate 13 and the second power input plate 14 define the fluid space A accommodating a driven plate 19, a coil spring 22, a viscous resistance generator 25 and so forth. The fluid space A is filled with the viscous fluid.

The driven plate 19 is a disk-like element, having its inner circumferential end coupled to the flange 3b of the hub flange 3 by a plurality of rivets 20. A plurality of window holes 19a extending in the circular direction are formed in intermediate portions of the driven plate 19 in a radial direction. Moreover, annular grooves 19b are formed on opposite surfaces of an outer circumferential end of the driven plate 19. A plurality of projections 19d expand outward in a radial direction from an outer circumferential surface 19c of the driven plate 19.

The coil spring 22 is a combination of small and large coil springs and is put in each of the window holes 19a of the driven plate 19. Seat elements 23 are placed at opposite ends of the coil spring 22. The first and second power input plates 13 and 14d are respectively provided with spring receptacles 13d and 14d corresponding in position to the window holes 19a of the driven plate 19. The seat elements 23 come in contact with opposite ends of the spring receptacles 13d and 14d in the circular direction, respectively. In this way, the first and second power input plates 13 and 14 are elastically coupled to each other in the circular direction with the coil spring 22 intervening between them. In an idle state, the seat elements 23 have their respective inner circumferences alone come in contact with ends of the spring receptacles 13d and 14d of the power input plates 13 and 14 and an end of the window hole 19a of the driven plate 19. Thus, the coil spring 22 is housed in the window hole 19a and the spring receptacles 13a and 14a, being partially pushed against them.

The viscous resistance generator 25 will now be described, although many of the components are similar or the same as components in the previous embodiments described above.

The viscous resistance generator 25 is comprised of an annular housing 27 provided at an outermost circumference within the space A, a plurality of pins 28 coupling the housing 27 to the first and second power input plates 13 and 14, and a plurality of sliders 29 provided within the housing 27.

The annular housing 27 is placed inside a cylindrical outer circumferential wall of the second power input plate 14 and has its opposite end surfaces in an axial direction interposed between the power input plates 13 and 14. There lies an opening close to an inner circumference of the annular housing 27, extending in the circular direction, and an outer circumference of the driven plate 19 is inserted in the opening. Within the annular housing 27, there is provided an annular fluid chamber B which is filled with the viscous fluid. Within the annular housing 27, additionally, a plurality of stoppers 27a are integrally formed at the same intervals in the circular direction, and they divide the annular fluid chamber B in a plurality of arched fluid sub-chambers B1. The stoppers 27a respectively have holes through which the pins 28 are inserted. The pins 28 have their respective opposite ends meshed with the power input plates 13 and 14 so as not to rotate by themselves. This allows the annular housing 27 to revolve integral with the first and second power input plates 13 and 14. A width of the annular housing 27 which determines a viscous resistance depends upon a length of a shank of the pins 28.

The annular housing 27 is provided at its inner end in a radial direction with opposing annular projections 27b (surrounding the opening mentioned above) which protrude inward at an inner end of the annular housing 27, and the projections 27b are fitted in the annular grooves 19b formed in the driven plate 19 to seal an inner circumference of the annular fluid chamber B. The projections 27b are engagement portions fitted in the annular grooves 19b and partake of load (thrust load, radial load and bending load) caused between a power input system (the first and second power input plates 13 and 14 and the annular housing 27) and a power output system (the driven plate 19 and the hub flange 3) with the viscous fluid intervening therebetween.

Return holes 27c are formed in inner opposite end surfaces of intermediate portions in a radial direction between the stoppers 27a, and the return holes 27c permit the viscous fluid to move between the annular fluid chamber B and the inner space A without interruption. In an idle state, the projections 19d of the driven plate 19 are arranged corresponding in position to the return holes 27c.

Within the arched fluid chambers B1, cap-like sliders 29 of resin are attached to cover the projections 19d of the driven plate 19 from the outer circumference. Each of the slider 29 has an outer circumference fitted in an inner circumference of the annular housing 27, and it is placed movable in a circular direction in each of the arched fluid chamber B1 (not shown in FIG. 21). The slider 29 is movable in the circular direction in a range where a wall in the circular direction is not in contact with the projection 19d of the driven plate 19. The slider 29 has notches 29a radially inside opposite walls in the circular direction. There also lie notches 29b radially inside opposite walls of the slider 29 in an axial direction. An interior portion of the slider 29 in a radial direction comes in contact with the annular projection 27b of the annular housing 27.

Each of the arcuate fluid sub-chambers 31 is further divided into a first larger cell similar to the cell 31 in the first embodiment, a second larger cell 32 by the slider 29, similar to the first embodiment described above. The slider 29 is divided into a first smaller cell 33 and a second smaller cell 34 by the projection 19d of the driven plate 19, again similar to the first embodiment described above. The embodiment depicted in FIG. 21 also includes the following elements and features which may not be shown, but are similar or the same as corresponding elements in the first embodiment described above: a gap defined between the projection 19d of the driven plate 19 and the slider 29, the notch 29b of the slider 29 and the return hole 27c permit the viscous fluid to move from the first smaller cell 33 to the second smaller cell 34 and vice versa; the viscous fluid passes the notch 29a of the slider 29 on the R2 side to flow between the first larger cell 31 and the first smaller cell 33 while it passes the notch 29a of the slider 29 on the R1 side to flow between the second smaller cell 34 and the second larger cell 32; when the wall of the slider 29 in the circular direction comes in contact with the projection 19d, however, the viscous fluid is blocked so as not to flow from or into the slider 29 in the circular direction; a choke C is provided between an inner circumferential surface of the stopper 27a and an outer circumferential surface 19c of the driven plate 19; when the viscous fluid passes the choke C, a large viscous resistance arises; an inner circumference of the driven plate 19 and the flange 3b of the hub flange 3 are fixed to each other by the rivets 20 with a spring seal 35 intervening between them; the spring seal 35 is an annulus ring of thin sheet metal and includes a fixing portion 35a having a plurality of holes through which the rivets 20 are fitted, an outer cylindrical portion 35b extending from an outer circumference of the fixing portion 35a toward the transmission, and a resilient portion 35c spreading outward from the outer cylindrical portion 35b. The resilient portion 35c is in contact with an inner circumferential end of the second power input plate 14 on a side close to the engine to urge the inner circumferential end of the second power input plate 14 toward the transmission. A reaction force caused by such urging force urges the driven plate 19 and the hub flange 3 toward the engine. The spring seal 35 seals the fluid space A between the inner circumference of the second power input plate 14 and the flange 3b of the hub flange 3.

The bearing 17 is placed between an outer circumferential surface of a cylindrical portion 13e of the center cap 13b and an inner circumference of a cylindrical portion of the flange 3b. The bearing 17 supports the hub flange 3 rotatably relative to the center cap 13b. An inner race of the bearing 17 is fitted in an outer circumference of the cylindrical portion 13e to come in contact with an inner circumferential end surface of the disk element 13a. An outer race of the bearing 17 is pressed into an inner circumferential surface of the flange 3b. Thus, the bearing 17 as well as the center cap 13b is positioned at the center hole 2a of the flexible plate 2. Consequently, the flexible plate 2, the center cap 13b and the bearing 17 are arranged to each other increasingly concentric.

Since engagement of the annular projection 27b of the housing 27 and the grooves 19b of the driven plate 19 in the viscous resistance generator 25 partakes of load caused between the power input system and the power output system, the load imposed on the bearing 17 can be reduced. Thus, dimensions of the bearing 17 can be reduced in a radial direction, and a cost can be decreased.

The bearing 17 has seal element at its opposite ends to seal between the inner race and an outer race. The seal element tightly seals in lubricant between the inner race and the outer race and seals the fluid space A between the center cap 13b and the hub flange 3.

A bearing 53 is placed inside the center cap 13b close to the engine. The bearing 53 rotatably supports a tip of the main drive shaft 302. Thus, the bearing 53 facilitates supporting the main drive shaft 302.

The hub flange 3 is urged by the spring seal 35 toward the engine, as mentioned above, and thus, the hub flange 3 impose preload toward the engine upon the bearing 17. As can be seen, the seal element 35 is a single component which has several functions like sealing the fluid space A, applying the preload to the bearing 17 and the like. This leads to decrease in the number of components, simplification of a configuration and a reduction of a fabrication cost. Since the seal element 35 is made of sheet metal, the cost is further reduced.

A first inertia element 42 is provided in the flange 3b of the hub flange 3 close to the transmission. The first inertial element 42 is a disk-like element covering the second power input plate 14 close to the transmission and has its inner circumferential end fixed to the flange 3b and the driven plate 19 by the rivets 20. A ring gear is welded to an outer circumference of the first inertia element 42. Although the ring gear 11 is an element welded to the outer circumference of the ring element 8 in the prior art embodiment, shifting it from the power input system to the power output system as in this embodiment, moment of inertia of the power output system, can be easily increased. When the moment of inertia of the power output system is increased, it is possible to decrease a resonance frequency down to an idling speed (a practical number of revolutions) or below in a drive system including the damper 1. With the ring gear 11 as has been used in the prior art, a cost reduction is attained.

A disk-shaped second inertia element 44 is fixed to the first inertial element 42 close to the transmission by a plurality of rivets 43.

Advantages in fabricating and assembling the power transfer device will now be described.

The disk element 13a and the center cap 13b are fixed to each other by means of welding, and the center cap 13b has the cylindrical portion 13e protruding toward the transmission. In such a configuration, fabrication of the cylindrical portion 13e for supporting the inner race of the bearing 17 is facilitated, and this leads to reduction of a fabrication cost.

Further in this embodiment, the holes 13c are formed corresponding in position to the outer race of the bearing 17 in an inner circumference of the disk element 13a. The holes 13c are utilized to press the outer race of the bearing 17 into the inner circumference of the flange 3b of the hub flange 3. Specifically, the bearing 17 before pressed in has its inner race fitted in the cylindrical portion 13e of the center cap 13b. The outer race under such a condition is pressed in the inner circumference of the flange 3b by pushing a driver into the hole 13c. In this manner, attachment of the bearing 17 is facilitated.

FIFTH EMBODIMENT

Figure 22:
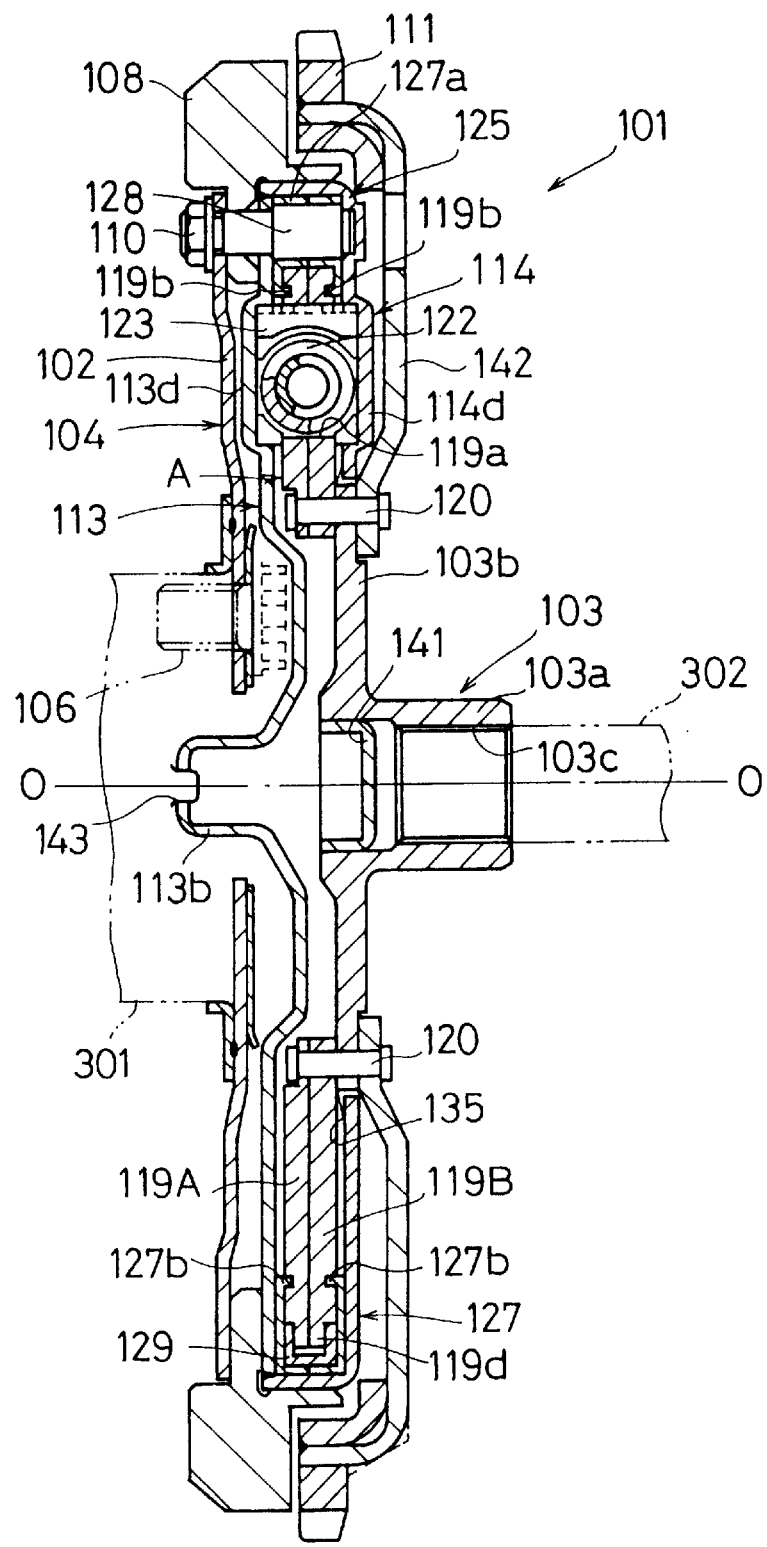
FIG. 22 is a fragmentary, side section schematic diagram showing a power transfer apparatus in accordance with a fifth embodiment of the present invention.

FIG. 22 shows a damper 101 in accordance with a fifth embodiment of the present invention. The damper 101 is a device which transmits torque from a crankshaft 301 in an engine to a main drive shaft 302 in a transmission and dampens torsional vibration between them. Referring to FIG. 22, the engine (not shown) is placed on the left of the drawing while the transmission (not shown) is on the right Line O—O of FIG. 22 is an axial line of rotation by the damper 101.

The damper 101 primarily includes a flexible plate 102, a ring element 108 fixed to the flexible plate 102, a hub flange 103, and a dampening element 104 elastically coupling the ring element 108 and the hub flange 103 in a circular direction to dampen the torsional vibration between them.

The flexible plate 102 is a roughly disk-shaped element which is flexible in axial directions and is generally rigid in a rotational direction. An inner circumferential end of the flexible plate 102 is fixed to a tip of the crankshaft 301 by a bolt 106. An outer circumferential end of the flexible plate 102 is fixed to the ring element 108 by a plurality of bolts 110.

The hub flange 103 is comprised of a boss 103 a and a flange 103b integrally formed along an outer circumference of the boss 103a. At the center of the boss 103a, a spline hole 103c in which spline teeth of the main drive shaft 302 expanding from the transmission is formed.

The dampening element 104 primarily includes a first power input plate 113, a second power input plate 114, a driven plate 119, a coil spring 122 and a viscous resistance generator 125.

The first and second power input plate 113 and 114 are disk-like elements of sheet metal. The first power input plate 113 has a disk element 113a and a boss 113b protruding from the center of the disk element 113a toward the engine. The boss 113b is drawn from the disk element 113a and shaped unitarily. The second power input plate 114 has at its outer circumferential end an outer circumferential wall which expands toward the engine and is fixed to an outer circumferential end of the first power input plate 113. The outer circumferential wall is fixed to an inner circumference of the ring element 108. The first and second power input plates 113 and 114 and the hub flange 103 defined a fluid space A filled with fluid. A hole 113c is formed at the center of the boss 113b, and a cap 143 is fitted in the hole 113c. The hole 113c is used to fill or discharge the fluid space A with viscous fluid. A cap-like seal element 114a is fixed at a center hole of the boss 103 close to the engine. The seal element 141 seals the fluid space A at the center of the boss 103a.

The driven plate 119 consists of two disk-shaped elements 119A and 119B and has its inner circumferential end coupled to the flange 103b of the hub flange 3 by a plurality of rivets 120. At center portions in radial directions in the driven plate 119, a plurality of window holes 119a are formed, extending in a circular direction. In opposite sides of an outer circumferential end of the driven plate 119, annular grooves 119b are formed, respectively. A plurality of projections 119d expand outward in the radial directions from a outer circumferential surface 119c of the driven plate 119.

The coil spring 122 is of a combination of large and small coil springs and is positioned in each of the window holes 119a of the driven plate 119. Seal elements 123 are provided at opposite ends of the coil spring 122. Spring receptacles 113d and 114d are formed corresponding in position to each of the window holes 119a of the driven plate 119 in the first and second power input plates 113 and 114, respectively. The seat elements 123 contact with opposite ends of the spring receptacles 113d and 114d in the circular direction. In this way, the first and second power input plates 113 and 114 and the driven plate 119 are elastically coupled to each other in the circular direction with the coil springs 122 intervening between them. Under an idle state, each of the seat elements 123 is in contact only at its inner circumference with ends of the spring receptacles 113d and 114d of the power input plates 113 and 114 and an end of the window hole 119a of the driven plate 119 (similar to the first embodiment depicted in FIG. 2). Specifically, the coil spring 122 is housed in the window hole 119a and the spring receptacles 113d and 114d, being partially pushed against them.

The viscous resistance generator 125 will now be described The viscous resistance generator 125 includes an annular housing 127 positioned in an outermost circumference in the fluid space A, a plurality of pins 128 coupling the annular housing 127 to the first and second power input plates 113 and 114, and a plurality of slides 129 put in the annular housing 127.

The annular housing 127 is placed inside an outer circumferential wall of the second power input plate 114 and has its opposite end surfaces in an axial direction interposed between the first and second power input plates 113 an 114. An opening extending in the circular direction is formed in an inner circumference of the annular housing 127, and an outer circumference of the driven plate 119 is inserted in the opening. Within the annular housing 127, an annular fluid chamber filled with viscous fluid is formed. Also within the annular housing 127, a plurality of stoppers 127a are disposed at the same intervals in the circular direction. The stoppers 127 divide the annular fluid chamber into a plurality of arched fluid sub-chambers. Each of the stoppers 127a has a hole through which a pin 128 extends. The pin 128 has its one end engaged with the second power input plate 114 so as not to rotate, and a tip of a bolt 110 is inserted in the pin 128. This permits the annular housing 127 to rotate along with the first and second power input plates 113 and 114 and the ring element 108 in a unity.

There is provided an annular projection 127b which protrudes inward at an inner end of the annular housing 27 in a radial direction (surrounding the opening mentioned above), and the projection 127b is fitted in the annular grooves 119b formed in the driven plate 119 to seal the inner circumference of annular fluid chamber. Engagement of the annular projection 127b with the grooves 119b takes load (thrust load, radial load and bending load) caused between a power input system (the first and second power input plates 113 and 114 and the annular housing 127) and a power output system (the driven plate 119 and the hub flange 103), with the viscous fluid intervening among them. Especially, since the annular projection 127b and the grooves 119b expand in the circular direction for engagement, the engagement partakes of the radial load between the power input system and the power output system as a bearing does in the prior art. Consequently, the bearing is omitted in this embodiment. This brings about simplification of the configuration of the power transfer device and decrease in a cost.

The sliders 129 are cap-shaped elements covering the projections 119d of the driven plate 119 from an outer circumferential side. Structural and functional characteristics of the sliders 129 are the same as those of the sliders illustrated in the above firs embodiment, and the description about them is omitted herein.

An inner circumference of the driven plate 119 and the flange 103b of the hub flange 103 are fixed to each other by the rivets 120 with a spring seal 135 sandwiched between them. The spring seal 135 is an annulus ring of thin sheet metal and is comprised of a fixing portion fixed by the rivets 120 and a seal portion which expands from the fixing portion to the outer circumference till coming in contact with an inner circumferential end of the second power input plate 114 to seal between the flange 103b and the inner circumferential end of the second power input plate 114.

An inertia element 142 is provided in the flange 103b of the hub flange 103 close to the transmission. The inertia element 142 is a disk-like element covering the second power input plate 114 close to the transmission and has its inner circumferential end fixed to the flange 103b and the driven plate 119 by the rivets 120. With the inertia element 142, moment of inertia of the power output system is increased. A ring gear 11 is welded to an outer circumference of the inertia element 142. Although the ring gear 111 is an element welded to an outer circumference of the ring element 108 in the prior art, shifting it from the power input system to the power output system as in this embodiment facilitate increasing the moment of inertia of the power output system. When a inertia moment ratio of the power output system is increased, it is possible to decrease a resonance frequency down to an idling speed (a practical number of revolutions) or below in a drive system including the damper 101. With the ring gear 11 as in the current embodiment, a cost reduction is attained when compared to the prior art.

An operation of this device is the same as that in the previous embodiment, and description about it is omitted.

SIXTH EMBODIMENT

Figure 23:
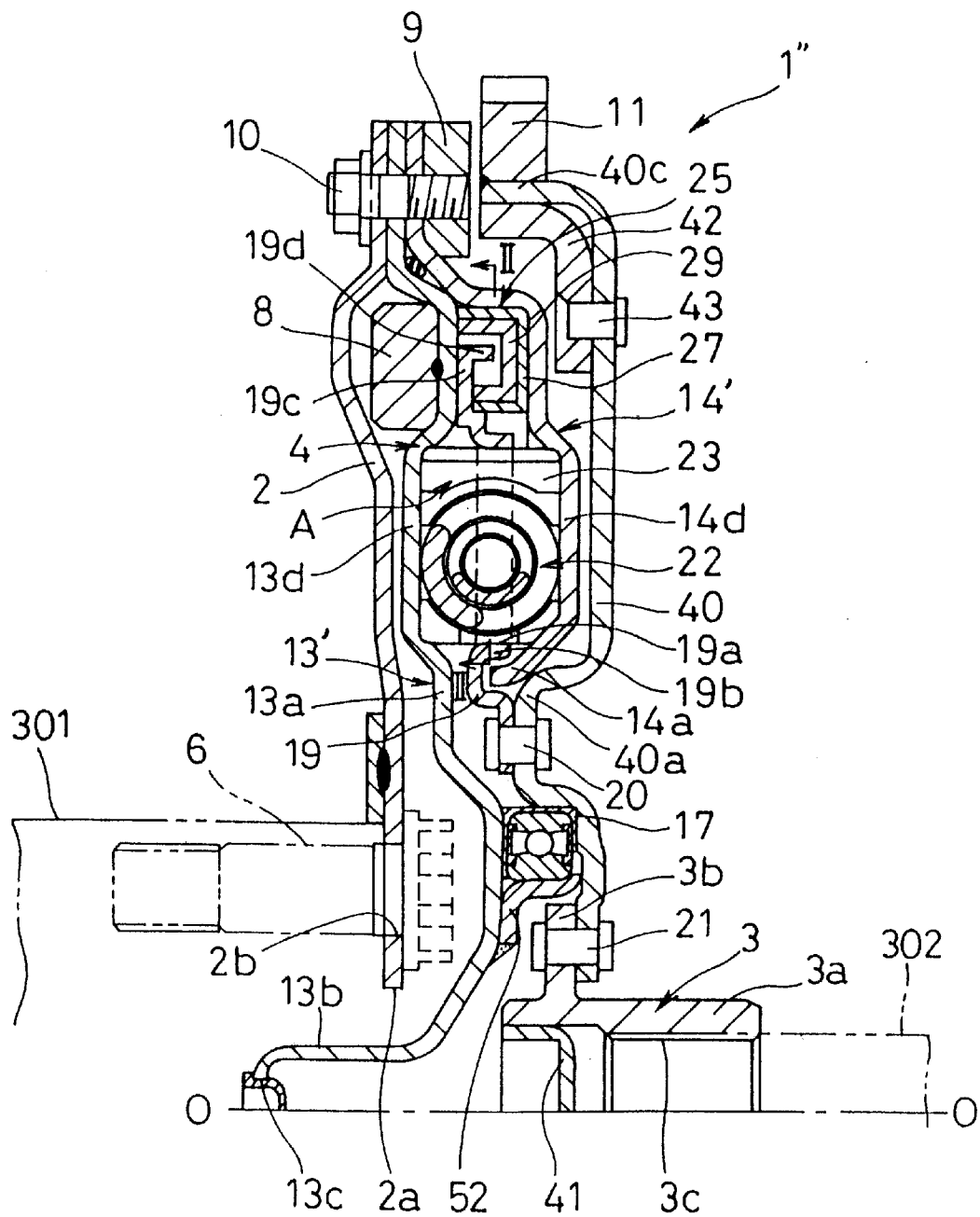
FIG. 23 is a fragmentary, side section schematic diagram showing a power transfer apparatus in accordance with a sixth embodiment of the present invention.
Figure 24:
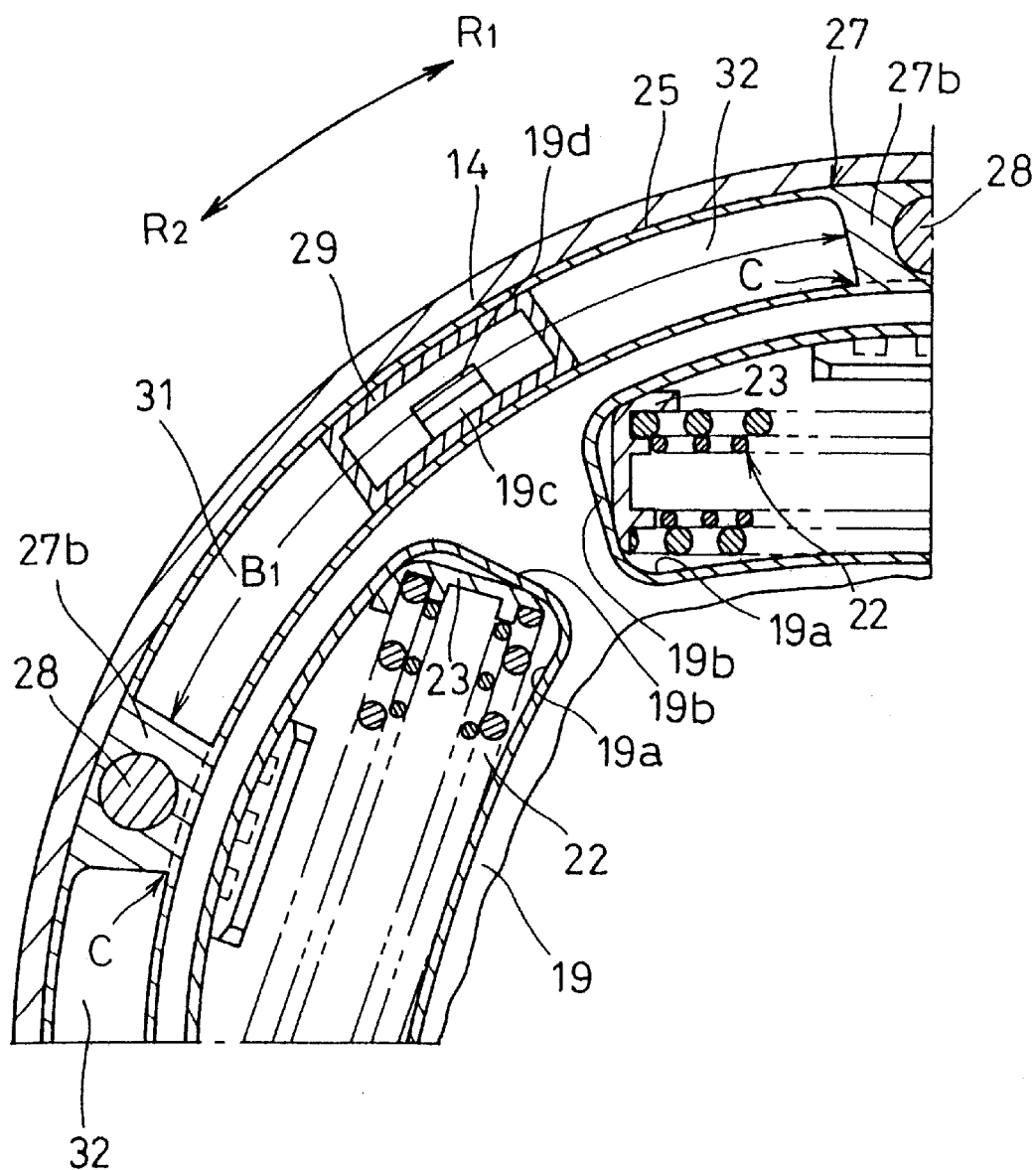
FIG. 24 is a fragmentary section rear view of a portion of the apparatus depicted in FIG. 23, on a slightly reduced scale.
Figure 25:
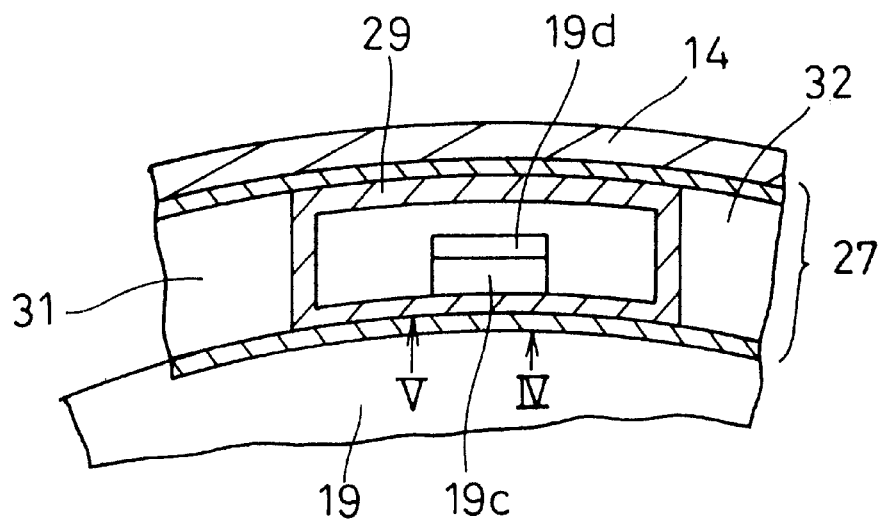
FIG. 25 is a fragmentary section taken along the line II—II in FIG. 24, on a slightly enlarged scale.

FIGS. 23, 24 and 25 show a damper 1" in accordance with a sixth embodiment of the present invention. The damper 1" is a device which transmits torque from a crankshaft 301 in an engine to a main drive shaft 302 in a transmission. Referring to FIG. 23, the engine (not shown) is positioned on the left of the drawing while the transmission (not shown) is positioned on the right. Line O—O in FIG. 23 is an axial line of rotations by the damper 1", and R1 denotes a direction of the rotations by the damper 1" (clockwise).

The damper 1" primarily includes a flexible plate 2, a hub flange 3, and a dampening element 4 which elastically couples the flexible plate 2 and the hub flange 3 in a circular direction and dampens torsional vibration between them.

The flexible plate 2 is a roughly disk-shaped element which is flexible in a flexural direction and is generally rigid in a rotational direction. The flexible plate 2 has a center hole 2a at its center. The flexible plate 2 is provided at its inner circumference with a plurality of bolt holes 2b at the same intervals in a circular direction. Bolts 6 extending through the bolts holes 2b fix an inner circumferential end of the plate 2 to a tip of the crankshaft 301. An outer circumferential end of the flexible plate 2 is fixed to a ring element 9 by a plurality of bolts 10. Outer circumferential ends of a first power input plate 13' and a second power input plate 14', described below, are interposed between an outer circumference of the flexible plate 2 and the ring element 9; that is, the first and second power input plates 13' and 14'are fixed to the flexible plate 2.

The hub flange 3 includes a boss 3a and a flange 3b integrally formed along an outer circumference of the boss 3a. The boss 3a is provided at its center with a spline hole 3c which engages spline teeth of the main drive shaft 302 extending from the transmission. A cap element 41 is fixed in a center hole of the boss 3c close to the engine.

An inner circumferential end of a disk-like inertia element 40 is fixed to the hub flange 3b by a plurality of rivets 21. The disk-like inertia element 40 has an annular projection 40a which protrudes, keeping off the center in a radial direction slightly closer to the inner circumference, toward the engine. The inertia element 42 is fixed to an outer circumference of the disk-like inertial element 40 close to the engine by a plurality of rivets 43. The disk-like inertia element 40 has an outer circumferential cylinder 40c extending toward the engine. A ring gear 11 to start the engine is fixed to an outer circumference of an outer circumferential cylinder 40c.

The dampening element 4 primarily includes the first power input plate 13', the second power input plate 14', a driven plate 19, a coil spring 22 and a viscous resistance generator 25.

The first and second power input plates 13' and 14' are disk-shaped elements of sheet metal and have their respective outer circumferences fixed to the flexible plate 2 and the ring element 9, as mentioned before. The first and second power input plates 13' and 14' define a fluid space A accommodating the driven plate 19, the coil springs 22, the viscous resistance generator 25 and so forth. The fluid space A is filled with viscous fluid.

The first power input plate 17 includes a disk element 13a and a center cap 13b protruding from the center of the disk element 13 toward the engine. The center cap 13b is drawn from the disk element 13a to shape in a unity. A hole 13c is formed at a center of tip of the center cap 13b. A plurality of inertia elements 8 are fixed to an outer circumference of the disk element 13a of the first power input plate 13' close to the engine.

A bearing 17 is positioned between the inner circumference of the first power input plate 13' and an inner circumference of the disk-like inertia element 40. The bearing 17 supports the disk-like inertia element 40 at its inner circumference rotatably relative to the first power input plate 13'.

An annular fixing element 52 which is L-shaped in cross section is fixed in the inner circumference of the disk element 13a of the first power input plate 13'. The annular fixing element 52 supports an inner race of the bearing 17. An outer race of the bearing 17 is held inside the annular projection 40a of the disk-like inertia element 40. The bearing 17 has a seal element of which opposite end surfaces are used to seal between the inner race and the outer race. The seal element seals in lubricant between the inner race and the outer race and seals the fluid space A between the inner circumference of the first power input plate 13' and the inner circumference of the disk-like inertia element 40.

The second power input plate 14' has a large center hole. An inner circumferential end 14a of the second power input plate 14' is bent toward the engine. The inner circumferential end 14a is close to the outer circumference of the annular projection 40a of the disk-like inertia element 40. The inner circumferential end 14a of the second power input plate 14' an be slightly deformed, so that pressure within the fluid space A causes it to continuously contact with the annular projection 40a.

The driven plate 19 is a single disk-shaped element of sheet metal and has its inner circumferential end fixed to the annular projection 40a of the disk-like inertia element 40 by a plurality of rivet 20. In intermediate portions of the driven plate 19 in radial directions, as shown in FIG. 24, a plurality of window holes 19a extending in a circular direction. Surrounding the entire circumferential extension of each of the window holes 19a, a flap 19b is formed raised extending toward the transmission. A plurality of projections 19c protrude outward in radial directions from an outer circumferential surface of the driven plate 19. At a tip of each of the projections 19c, a flap 19d is formed being bent toward the transmission.

A coil spring 22 is a combination of large and small coil springs, and it is positioned in each of the window holes 19a of the driven plate 19. At opposite ends of the coil spring 22, seat elements 23 are attached. The first and second power input plates 13' and 14' are respectively provided with spring receptacles 13d and 14d corresponding in position to the window holes 19a of the driven plate 19. The seat elements 23 come in contact with opposite ends of the spring receptacles 13d and 14d in a circular direction, respectively. Thus, the first and second power input plates 13' and 14' and the driven plate 19 are elastically coupled to each other in the circular direction, with the coil springs 22 intervening between them. Under an idle state as shown in FIG. 24, each of the seat elements 23 has its inner circumference alone put in contact with ends of the spring receptacles 13a and 14a of the first and second power input plates 13' and 14' and an end of the window hole 19a of the driven plate 19. This means the coil spring 22 is housed in the window hole 19a and the spring receptacles 13a and 14a, being partially pushed against them.

The seat element 23 is supported by the flap 19b formed in the driven plate 19. With such an element as the flap 19b, the driven plate can decrease bearing stress caused in supporting the coil spring 22 and the seat element 23, and its durability is improved. Consequently, it is needless employing several sheet metal plates or disk plate of thick casting parts as in the prior art Thus, a weight of the driven plate is reduced and a cost is decreased.

The driven plate 19 is placed within the fluid space A, and hence, the flap 19b of the driven plate is lubricated by the viscous fluid. This results in the flap 19b having improved durability.

The viscous resistance generator 25 will now be described. The viscous resistance generator 25 includes an annular housing 27 positioned in an outermost circumference within the fluid space A, a plurality of pins 28 coupling the annular housing 27 to the first and second power plates 13' and 14' (see FIG. 24), and a plurality of sliders 29 arranged in the annular housing 27.

Figure 26:
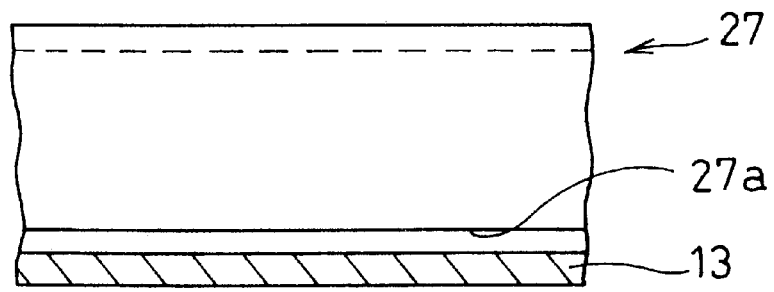
FIG. 26 is a fragmentary section taken vertically from the point IV in FIG. 25, on a slightly enlarged scale.
Figure 27:
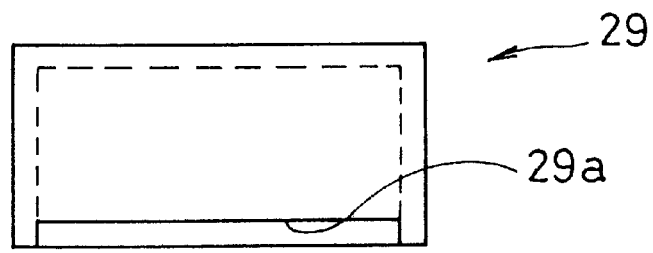
FIG. 27 is a fragmentary section taken vertically from the point V in FIG. 25, on a slightly enlarged scale.

The annular housing 27 is positioned inside an outer circumferential cylindrical wall of the second power input plate 14' and has its axially opposite end surfaces interposed between the first and second power input plates 13' and 14'. The annular housing 27 is U-shaped in cross section opening toward the engine, and as shown in FIGS. 26 and 27, its inner circumferential surface close to the engine and the first power input plate 13' together define a gap 27a extending in a circular direction. The outer circumference of the driven plate 19 is fitted in the gap 27a. A plurality of stoppers 27b are formed at the same intervals in the circular direction in and integral with the annular housing 27. The stoppers 27b divide an annular fluid chamber B into a plurality of arched fluid sub-chambers B1. The stoppers 27b have respective holes through which the pins 28 extent. Each of the pins 28 has its opposite ends engaged with the first and second power input plates 13' and 14' so as not to rotate by itself. This allows the annular housing 27 to rotate along with the first and second power input plates 13' and 14' in a unity.

Each of the stoppers 27b is provided with a choke C which is defined between an outer circumferential surface of the driven plate 19 and the stopper to connect each of the arched fluid chambers B1. The viscous fluid passing by the choke C causes a large viscous resistance.

A box-shaped resin slider 29 is placed within each of the arched fluid chamber B1, covering the projection 19c and flap 19d of the driven plate 19. The slider 29 has its side closest to the engine opened. The slider 29 has a face fitted in an inner circumferential surface of the annular housing 27 and is movable in the circular direction in the arched fluid chamber B1. The slider 29, as shown in FIG. 27, has at an inner circumference close to the engine a notch 29a extending in the circular direction. The projection 19c of the driven plate 19 passes through the notch 29a and extends into the slider 29. Thus, the slider 29 is movable in the circular direction relative to the projection 19c and flap 19d of the driven plate 19 in a range. There a wall in the circular direction is not in contact with the flap 19d.

The slider 29 divide the arched fluid chamber B1 into a first cell 31 on a side designated as R2 and a second cell 32 on a side designated as R1.

An operation of the power transfer device will now be described

When torque is received from the crankshaft 301 to the flexible plate 2, the first and second power input plates 13' and 14' and the coil springs 22 transmit the torque to apply it to the driven plate 19. The torque received by the driven plate 19 is transmitted to the hub flange 3 via the disk-like inertia element 40 till it is applied to the main drive shaft 302. Bending vibration contained in the torque transmitted from the crankshaft 301 is absorbed by the flexible plate 2.

An operation in the event that torsional vibration is transmitted from the crankshaft 301 to the damper 1 will be described. In the following explanation, the operation involves the torsional vibration transmitted between a power input system (the first and second power input plates 13' and 14' and the annular housing 27) and a power output system (the driven plate 19, the disk-like inertia element 40 and the hub flange 3).

It is now assumed that torsional vibration of a small torsional angle (minute vibration) at which a wall of the slider 29 in a circular direction does not come in contact with the projection 19c and flap 19d of the driven plate 19 is transmitted. In such a situation, the annular housing 27 and the slider 29 do not rotate relative to each other, and therefore, the viscous fluid does not pass the choke C. In other words, during the minute vibration, a large viscous resistance does not arise. Also during the minute vibration, the coil spring 22 expands or contracts, being partially pushed against the window hole 19a of the driven plate 19 and the spring receptacles 13d and 14d of the first and second power input plates 13' and 14'. Thus, a low rigidity is retained. Thus, under the minute vibration, characteristics of low rigidity and small viscous resistance are attained, and this is effective to suppress abnormal sound like clattering sound by the transmission or heavy sound.

An operation in the event that torsional vibration of a large torsional angle (referred to as 'grand vibration' hereinafter) is transmitted will be described below.

When the wall of the slider 29 in the circular direction comes in contact with the flap 19d of the driven plate 19, the first cell 31 or the second cell 32 is compressed between the slider 29 and the stopper 27b. The viscous fluid flows from the compressed cell through the choke C into adjacent fluid chambers B1. When the viscous fluid passes the choke C, a large viscous resistance arises.

As mentioned above, during the grand vibration, a large viscous resistance is obtained. Additionally, as the torsional angle becomes larger, the seat elements 23 on the coil spring 22 come to be in contact with the end of the window hole 19a and the ends of the spring receptacles 13d and 14d of the first and second power input plates 13' and 14', and thus, the rigidity is enhanced. Thus, during the grand vibration, characteristics of high rigidity and large viscous resistance are attained, and this effectively dampens vibration upon tip-in-tip-out (large vibration forward and backward of an automobile caused by rapid operation of an accelerating pedal).

It is assumed that the minute vibration is transmitted under the condition that the annular housing 27 is displaced by a specified angle relative to the driven plate 19. The slider 29 repeats reciprocal torsional motions related to the flap 19d in an angular range where the wall of the slider 29 in the circular direction is in contact with the projection 19c and flap 19d. In such a case, the viscous fluid does not flow at the choke C, and a large viscous resistance does not arise. Thus, even with a large torsional angle made between the annular housing 27 and the driven plate 19, the minute vibration can be effectively dampened.

When pressure is caused in the fluid space A because of viscous resistance or centrifugal force during the operation, the inner circumference 14a of the second power input plate 14' moves and comes in contact with an outer circumference of the annular projection 40a of the disk-like inertia element 40. As a result, sealing is carried out between the second power input plate 14' and the disk-like inertia element 40. Since a seal element required in the prior art can be omitted in this embodiment, the power transfer device is structurally simplified, and its cost is reduced.

Various modifications of the present invention can be devised without departing from the scope of the invention the foregoing description is in all aspects illustrative, and it is not intended that the present invention be limited to precise forms disclosed in the appended claims and equivalents thereto.

What is claimed is:

1. A damper disk assembly adapted to transmit torque between an input member and an output member, the damper disk assembly comprising a first plate member configured to be connection to the power input member, a hub adapted for connection to the output member, a second plate member having an inner circumferential portion thereof fixed to an outer circumference of said hub, a bearing supported between said first plate member and said second plate, said bearing being adapted to allow relative rotation between said first and second plate members, and a dampening portion elastically coupling said first plate member and said second plate member in a circular direction for dampening torsional vibration between said first plate member and said hub.

2. The damper disk assembly according to claim 1, wherein said bearing has an outer race and an inner race, the outer race is attached to said second plate member and said inner race is attached to said first plate member.

3. The damper disk assembly according to claim 2, wherein said first plate member comprises:

a disk-like plate formed from sheet metal material; and a supporting element fixed to said disk-like plate for supporting said inner race.

4. The damper disk assembly according to claim 3, wherein said supporting element is an annular member having an L-shaped when viewed in cross section.

5. The damper disk assembly according to claim 3, wherein said second plate member is formed of a sheet metal material shaped with an annular projection engaged with said outer race.

6. The damper disk assembly according to claim 1, wherein said dampening portion includes:

a single sheet metal disk-like drive plate connected to said first plate member, said disk-like drive plate formed with an arcuate shaped first wall extending in a circular direction, said disk-like drive plate formed with a radially extending second wall, said first and second walls at least partially defining a chamber;

an elastic element disposed in said chamber, said elastic member being supported by said second wall;

a sheet metal disk-like driven plate connected to said second plate member, said driven plate extending into said chamber contacting said elastic element such that said elastic element elastically couples said first plate member and said driven plate in the circular direction; and a hysteresis resistance generating device for producing hysteresis resistance to relative rotary displacement between said first plate member and said hub.

7. The damper disk assembly according to claim 6 wherein said first plate member, said drive plate and said driven plate define said chamber, said chamber being fluid filed.

8. The damper disk assembly according to claim 7, further comprising:

at least one annular housing having two co-axial spaced apart circumferentially extending walls and an annular wall extending in a radial direction therebetween, said annular housing being open in an axial direction toward said first plate member;

a slider member disposed in said annular housing, said slider member having an arcuate shape having two co-axial circumferentially extending walls and a wall extending in a radial direction therebetween and two circumferential end walls extending between said co-axial circumferentially extending walls of said slider member, said slider member being open in an axial direction toward said first plate; and wherein said driven plate is formed with a radially outward extending projection that extends into said slider, said projection extending radially outward adjacent to said first plate member such that in response to relative rotary displacement between said hub and said first plate member, said projection moves in a circumferential direction within said slider member within a first range of relative rotary displacement, and within a second range of relative rotary displacement said projection engages one of said end walls of said slider member such that said slider member moves in a circumferential direction within said annular housing thereby generating fluid resistance to movement.

9. A power coupling mechanism, comprising:

a hub being connectable with an input shaft of a transmission;

a driven plate assembly rigidly connected to said hub;

a bearing contacting a portion of said driven plate assembly;

a drive plate assembly a portion of said drive plate assembly contacting said bearing to allow for relative rotation between said driven plate assembly and said drive plate assembly, at least a portion of said drive plate assembly defining an annular chamber, said drive plate assembly being configured for connection to a crankshaft of a rotary power device; and a vibration dampening mechanism disposed within said annular chamber of said drive plate assembly elastically coupling said drive plate assembly and said driven plate assembly limiting relative rotary displacement between said drive plate assembly and said driven plate assembly.

10. The power coupling mechanism as in claim 9 wherein said driven plate assembly is rigidly connected to said hub by a plurality of axially extending rivets which extend through a portion of said hub and a portion of said driven plate assembly.

11. The power coupling mechanism as in claim 9 wherein said drive plate assembly comprises a flexible plate, a first input plate and a second input plate, said flexible plate fixed at a radial outer portion thereof to said first and second input plate, said flexible plate being configured for connection to the crankshaft, and substantially all of said annular chamber is located between portions of said first input plate and said second input plate.

12. The power coupling mechanism as in claim 11, wherein said first input plate of said drive plate assembly supports said bearing.

13. The power coupling mechanism as in claim 11, wherein said driven plate assembly comprises a driven plate and a disk-like inertia plate fixed to said driven plate, wherein portions of said driven plate assembly that contacts said bearing is said has said disk-like inertia plate which is fixed to said hub and is supported on said bearing.

14. The power coupling mechanism as in claim 13, wherein an annular housing is disposed in a radially outward portion of said annular chamber and said driven plate is formed with a radially outwardly extending protrusion that extends into a portion of said annular housing.

15. The power coupling mechanism as in claim 14, further comprising:

a slider disposed in said annular housing, said protrusion of said driven plate extending into said slider; and wherein, in response to relative rotation between said driven plate assembly and said drive plate assembly in a first angular displacement range, said protrusion is circumferentially displaced within said slider, and in response to relative rotation between said driven plate assembly and said drive plate assembly in a second angular displacement range greater than said first angular displacement range, said protrusion is engagable with said slider causing circumferential displacement of said slider with said protrusion.

16. The power coupling mechanism as in claim 15, further comprising:

at least one coil spring disposed in said annular chamber radially inward from said annular housing, said coil spring being disposed between portions of said first and second drive plates and said driven plate, said coil spring being compressible in response to relative rotation between said driven plate assembly and said drive plate assembly.

* * * * *